US006982534B2

(12) United States Patent
Hahn et al.

(10) Patent No.: US 6,982,534 B2
(45) Date of Patent: Jan. 3, 2006

(54) METHOD FOR OPERATING AN ELECTRONICALLY COMMUTATED MOTOR, AND MOTOR FOR CARRYING OUT ONE SUCH METHOD

(75) Inventors: Alexander Hahn, Sauldorf-Boll (DE); Walter Heydrich, Georgen (DE); Hermann Rappenecker, Vöhrenbach (DE)

(73) Assignee: ebm-papst St. Georgen GmbH & Co. KG, St. Gerogen (DE)

( * ) Notice: Subject to any disclaimer, the term of this patent is extended or adjusted under 35 U.S.C. 154(b) by 12 days.

(21) Appl. No.: 10/487,461

(22) PCT Filed: Aug. 7, 2002

(86) PCT No.: PCT/EP02/08802

§ 371 (c)(1),
(2), (4) Date: Feb. 19, 2004

(87) PCT Pub. No.: WO03/034581

PCT Pub. Date: Apr. 24, 2003

(65) Prior Publication Data

US 2004/0251863 A1    Dec. 16, 2004

(30) Foreign Application Priority Data

Oct. 10, 2001   (DE) ................... 101 49 935

(51) Int. Cl.
H02K 17/32    (2006.01)
(52) U.S. Cl. .................. 318/434; 318/138; 318/254
(58) Field of Classification Search ........... 318/434, 318/254, 138, 471, 432, 433; 388/811
See application file for complete search history.

(56) References Cited

U.S. PATENT DOCUMENTS 4,814,675 A    3/1989   Perilhon ............... 318/254
4,839,754 A    6/1989   Gami et al. .......... 360/73.01

(Continued)

FOREIGN PATENT DOCUMENTS

CA    2334674        12/1999
DE    30 44 027 A1    8/1981
DE    36 07 014 A1    9/1986

(Continued)

OTHER PUBLICATIONS

Derwent WPI English abstract of DE 30 44 027-A1, Müller, pub. Aug. 1981.

*Primary Examiner*—Karen Masih
(74) *Attorney, Agent, or Firm*—Milton Oliver, Esq.; Ware Fressola Van Der Sluys & Adolphson LLP

(57) ABSTRACT

The invention concerns a method for operating an electronically commutated motor (10) that is equipped with a current limiting arrangement which acts on a PWM controller (56). The latter, in operation, delivers PWM pulses (60) having a controllable pulse duty ratio (pwm) and a substantially constant frequency. In the event a predetermined upper limit value ($I_{soll}$; $I_w$) of the motor current ($I_{ist}$) is exceeded, the current limiting arrangement effects a change in this pulse duty factor (pwm) in order to reduce the motor current ($I_{ist}$). If the motor current ($I_{ist}$) exceeds a predetermined upper limit value ($I_{soll}$; $I_w$) while the motor (10) is rotating, that limit value ($I_{soll}$; $I_w$) is raised by a timing member (260) during a predetermined time span (304) (FIG. 8: $I_{wmax}$), so that the available motor power is temporarily raised in the context of a load peak. If the rotor (24) is stalled, the limit value ($I_{soll}$) is not raised but instead is greatly lowered. The limit value ($I_{soll}$) is preferably raised as a function of the rotation speed of the motor (10) in order to utilize the improved motor cooling at high rotation speeds. At start-up of the motor (10), the limit value ($I_{soll}$) is briefly increased to a high value in order to enable dependable starting.

17 Claims, 11 Drawing Sheets

U.S. PATENT DOCUMENTS

| | | | | |
|---|---|---|---|---|
| 4,845,414 A | | 7/1989 | Angelis et al. | 318/434 |
| 5,268,623 A | | 12/1993 | Müller | 318/434 |
| 6,091,887 A | * | 7/2000 | Dieterle et al. | 388/811 |
| 6,452,349 B1 | | 9/2002 | Hahn et al. | 318/254 |
| 6,593,716 B1 | * | 7/2003 | Lange et al. | 318/471 |

FOREIGN PATENT DOCUMENTS

| | | |
|---|---|---|
| DE | 198 26 458 A1 | 12/1999 |
| DE | 199 49 804 A1 | 5/2000 |
| EP | 0 270 850 A1 | 6/1988 |
| EP | 0 245 415 B1 | 9/1990 |

* cited by examiner

METHOD FOR OPERATING AN ELECTRONICALLY COMMUTATED MOTOR, AND MOTOR FOR CARRYING OUT ONE SUCH METHOD

Electronically commutated motors are used for many driving tasks, e.g. in vacuum cleaners, equipment fans, medical devices, video recording devices, etc. Such motors are subject to many requirements, among which a low price is paramount. This means that a motor of this kind must be efficiently utilized for the particular driving task without being overloaded.

This is usually achieved by current limitation, i.e. the motor current is limited so that it cannot exceed a predetermined upper limit value. The power of such a motor is then, however, unnecessarily limited at startup, when a particularly high motor power is necessary. Many such motors could also be operated at higher power at high rotation speeds, since their cooling is then better and such a motor could absorb and deliver greater power. A motor of this kind could also, in many cases, temporarily deliver more power in the context of a load peak because it has a "thermal reserve," i.e. the motor does not immediately overheat if an overload occurs briefly. There exist special circuits for this purpose with which a motor can be "simulated" by means of an electronic or mechanical model, but such solutions are too expensive for low-cost applications.

It is therefore an object of the invention to make available a novel method for operating an electronically commutated motor, and a novel electronically motor for carrying out such a method.

According to a first aspect of the invention, this object is achieved by means of the subject matter of Claim 1. If a load peak occurs in such a motor so that the motor current exceeds its predetermined limit value, that limit value is increased by a timing member during a predetermined time span, provided the motor is rotating. The available power of the motor is thereby temporarily increased in the event of a load peak. Provision is preferably made, however, to prevent that increase from also occurring if the motor is stalled, since in that case the motor current should be as low as possible in order to avoid overheating and the resulting risk of fire. Preferred developments of such a method are the subject matter of Claims 2 and 3. A motor for carrying out this method is the subject matter of Claim 10.

Another approach to achieving the stated object is the subject matter of Claim 4. Because at least one current pulse is generated and is conveyed to the voltage divider, the current flowing to the voltage divider becomes greater for the duration of that current pulse, and the upper current limit thus rises. This allows better utilization of the motor, especially when rotation-speed-dependent current pulses—which increase the upper current limit with increasing rotation speed—are generated. The reason for this is that a motor is usually cooled better as rotation speed rises, and can therefore deliver more power. This applies in particular to external-rotor motors. A motor for carrying out a method of this kind is the subject matter of Claim 11.

A further approach to achieving the stated object is the subject matter of Claim 7. The capacitor that is connected in parallel with a splitting resistor of the voltage divider is discharged before the motor is switched on. Immediately after switching on, it therefore acts as a short circuit for that splitting resistor and thus increases the upper limit value at startup temporarily, i.e. until that capacitor has charged. It is thereby possible, in a motor of this kind, to raise the starting torque without causing a long-term overload of the motor. A motor for carrying out a method of this kind is the subject matter of Claim 12.

Another approach to achieving the stated object is the subject matter of Claim 8. In such a motor, the output signals of the rotor position sensors have a relatively low frequency that is proportional to the motor rotation speed. The invention allows this frequency to be increased, specifically in such a way that beginning at a rotation speed of zero (at which the increased frequency also has a value of zero), a signal is available whose frequency is increased by a factor of three, for example, in a three-phase motor; this makes possible, for example, a more accurate indication of rotation speed, more accurate rotation speed control, more accurate sensing of the rotor rotational position, and more exact adaptation of the upper limit value of the motor current to the instantaneous rotation speed. In many cases this allows expensive encoders to be dispensed with.

A preferred development of the invention according to Claim 8 is the subject matter of Claim 9.

According to Claim 13, the invention is suitable in particularly advantageous fashion for electronically commutated external-rotor motors.

Further details and advantageous developments of the invention are evident from the exemplary embodiment, which is in no way to be understood as a limitation of the invention, that is described below and depicted in the drawings, and from the dependent claims. In the drawings:

Figure 5:
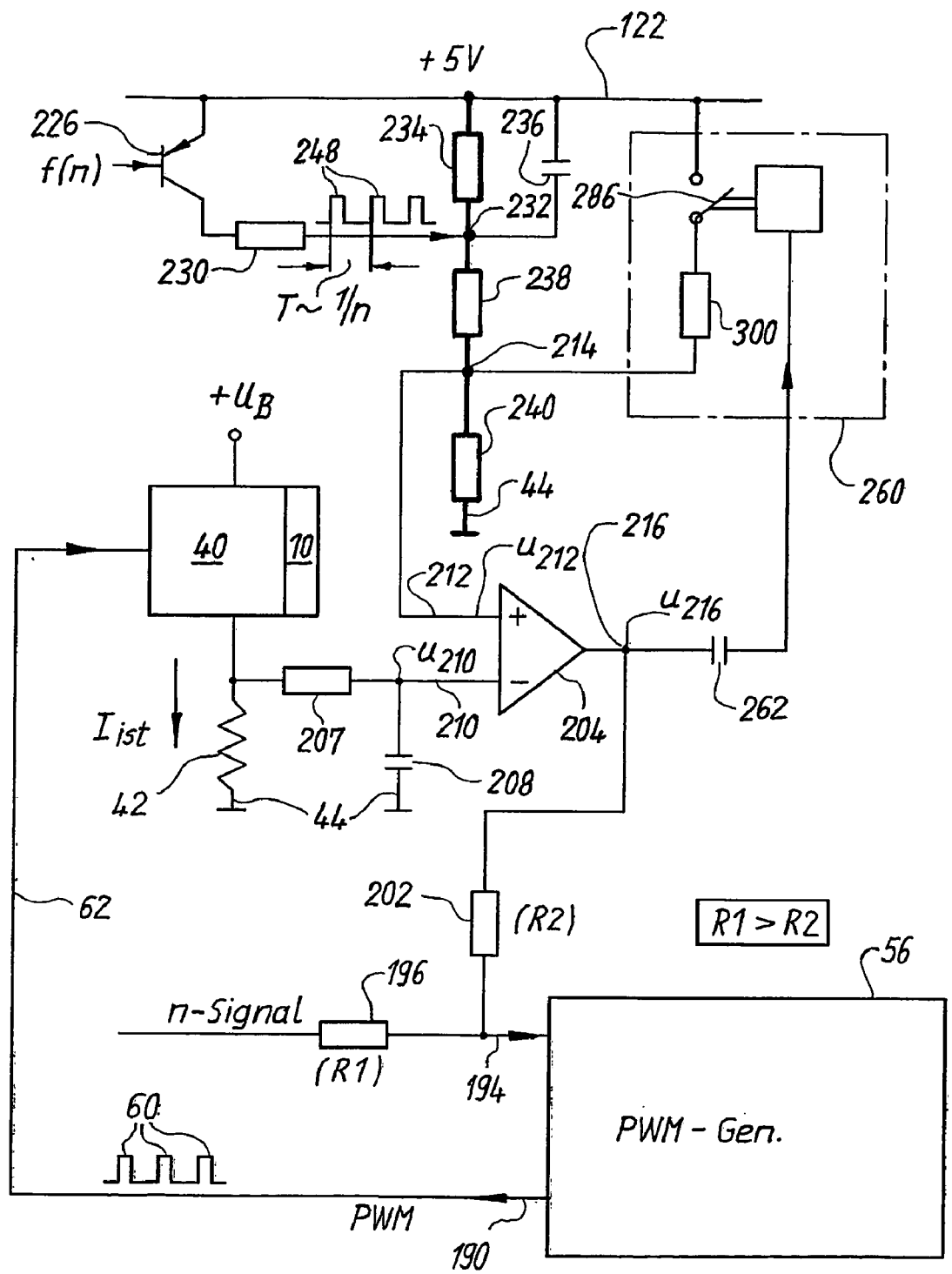
FIG. 5 is an overview depicting the manner in which several preferred components interact.
Figure 6:
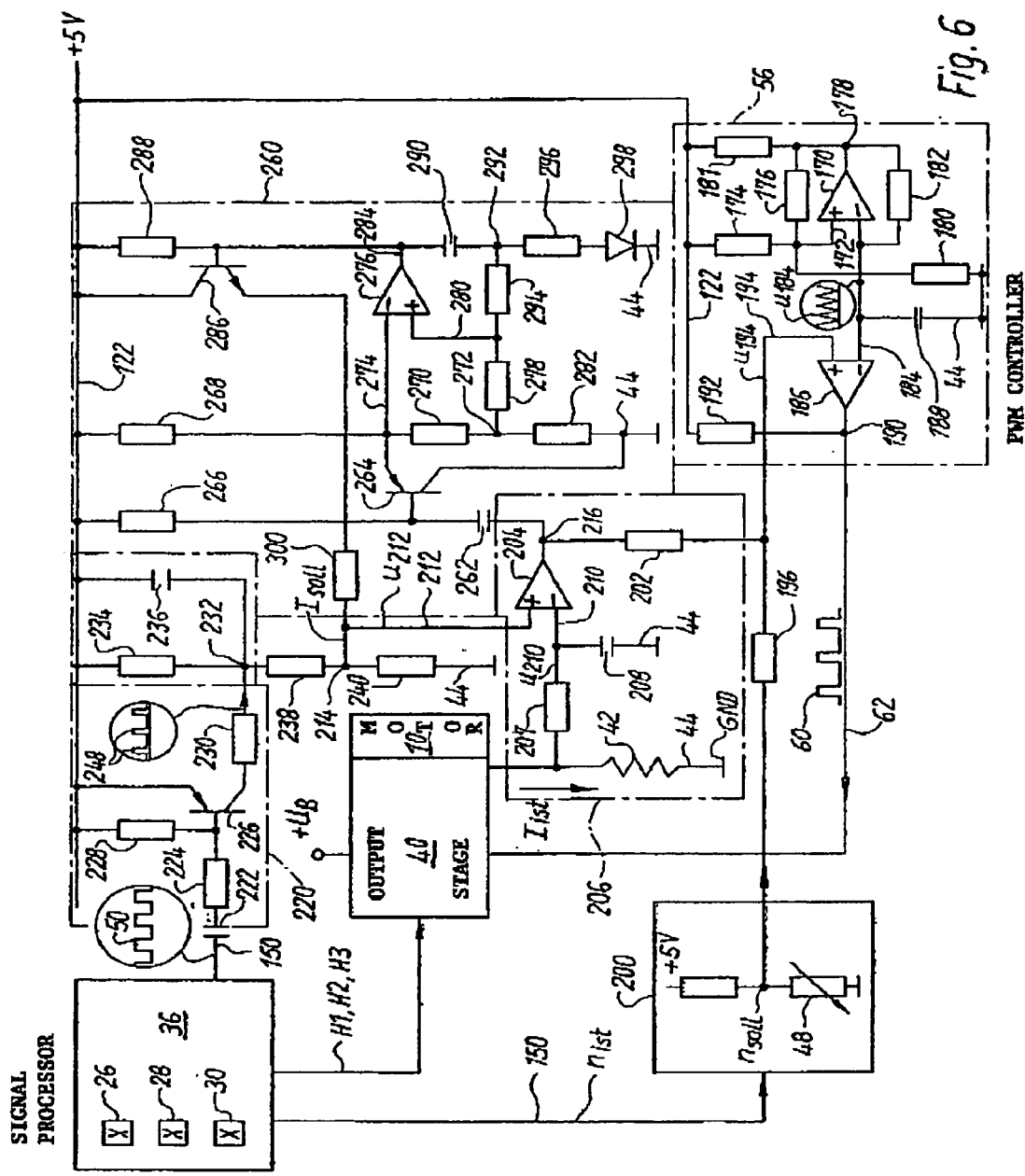
FIG. 6 is a circuit diagram showing further details of the arrangement according to FIG. 5.
Figure 7:
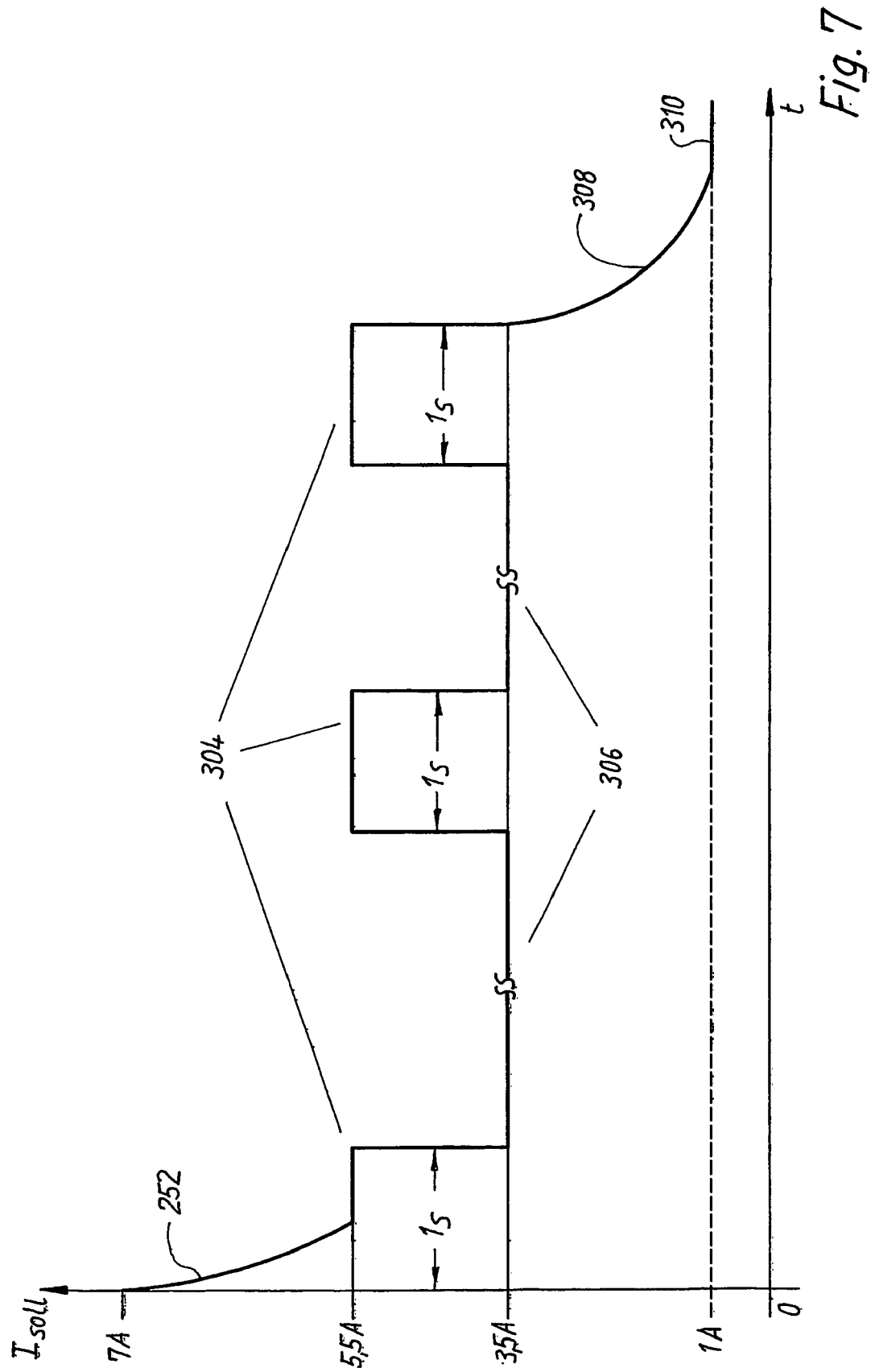
Figure 8:
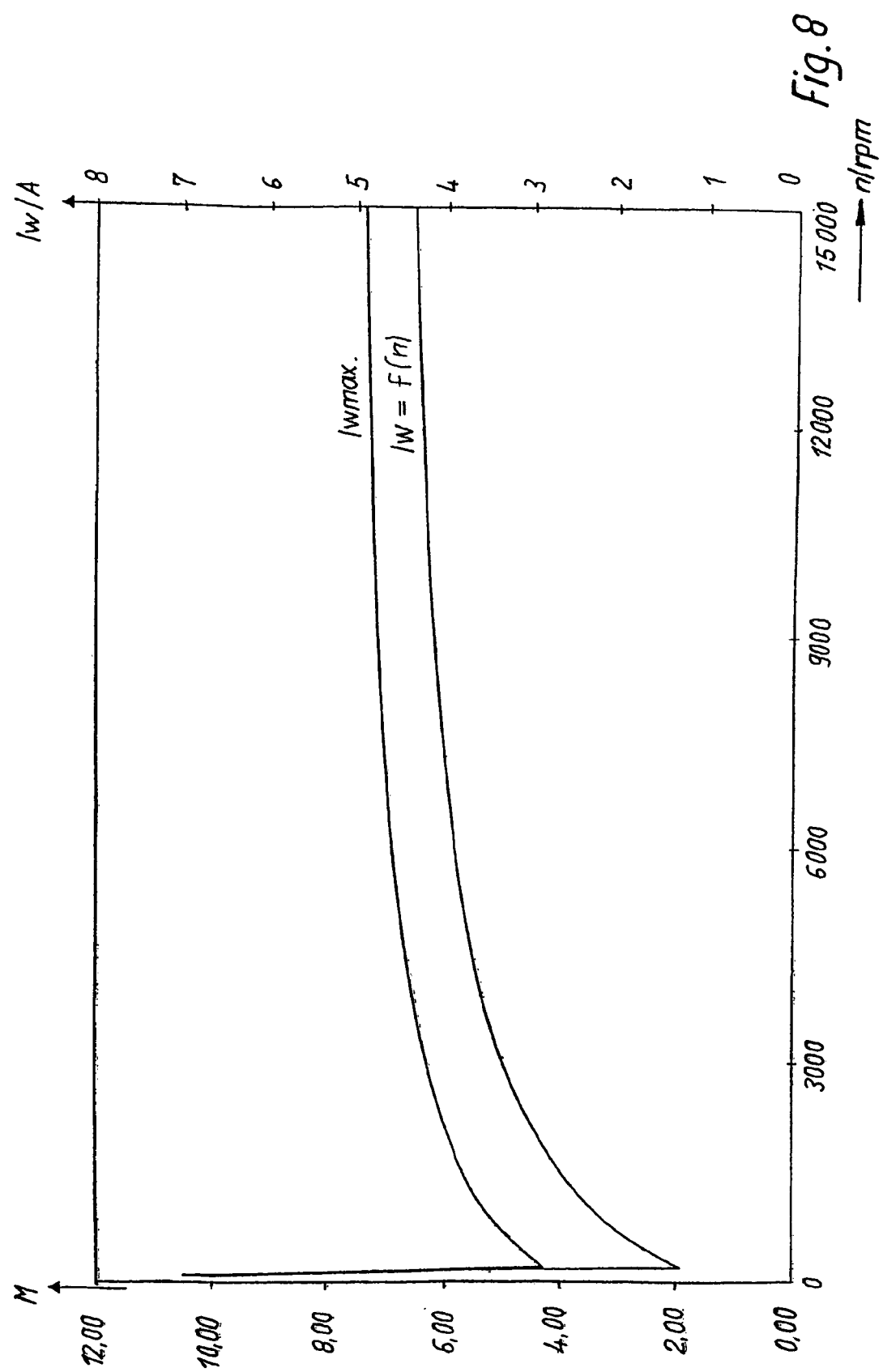
Figure 9:
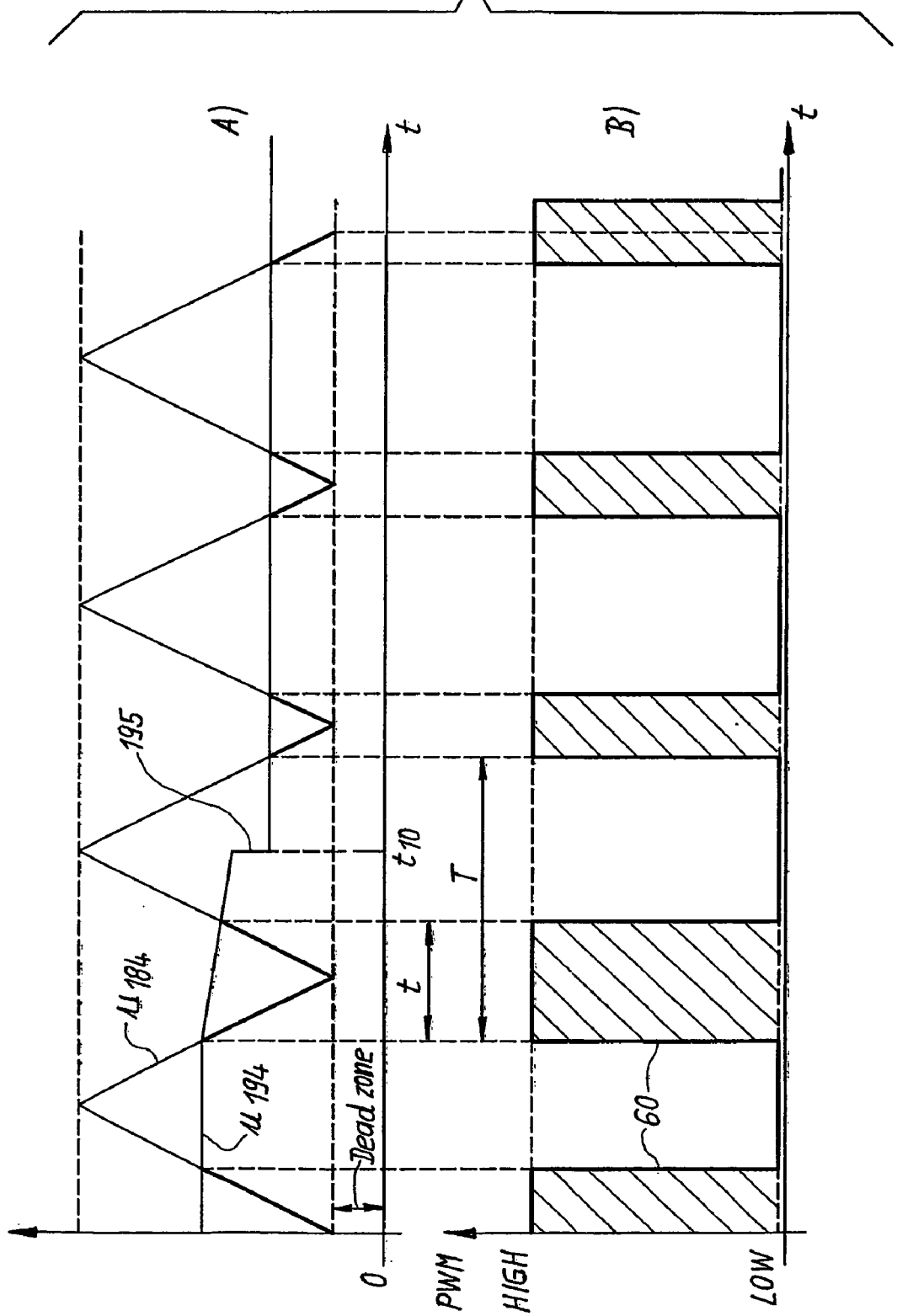
Figure 10:
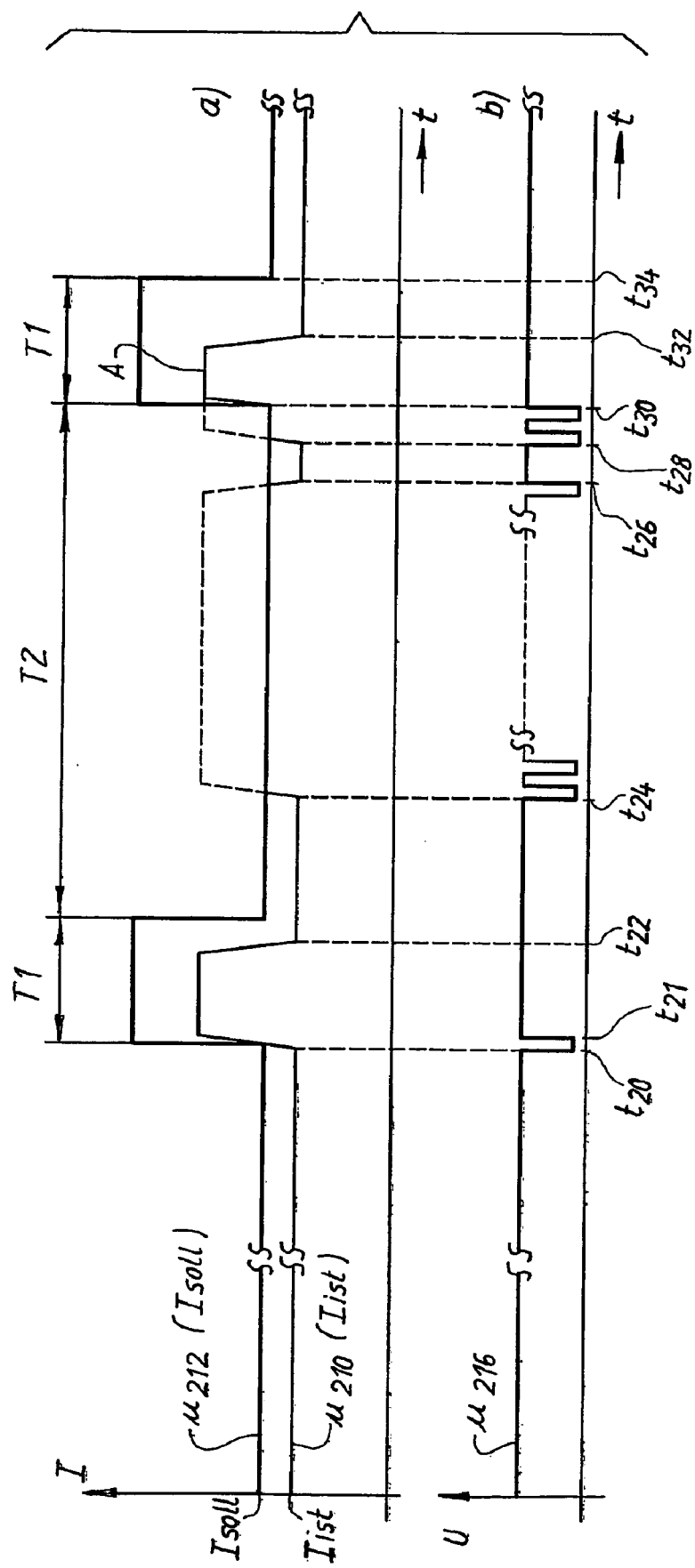
Figure 11:
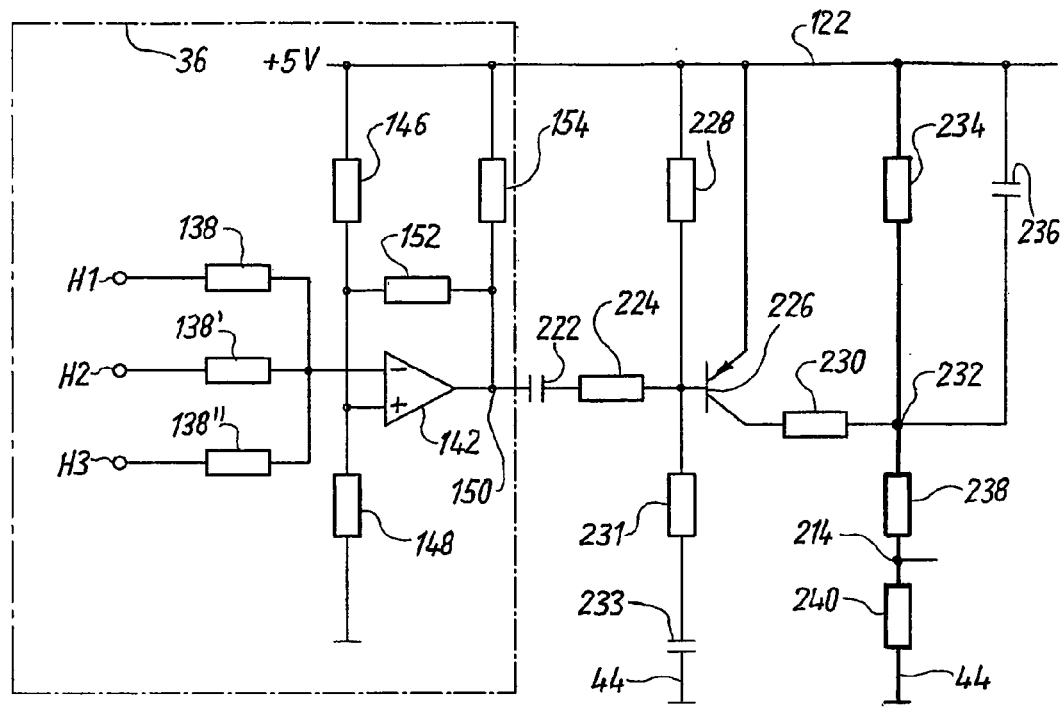
Figure 12:
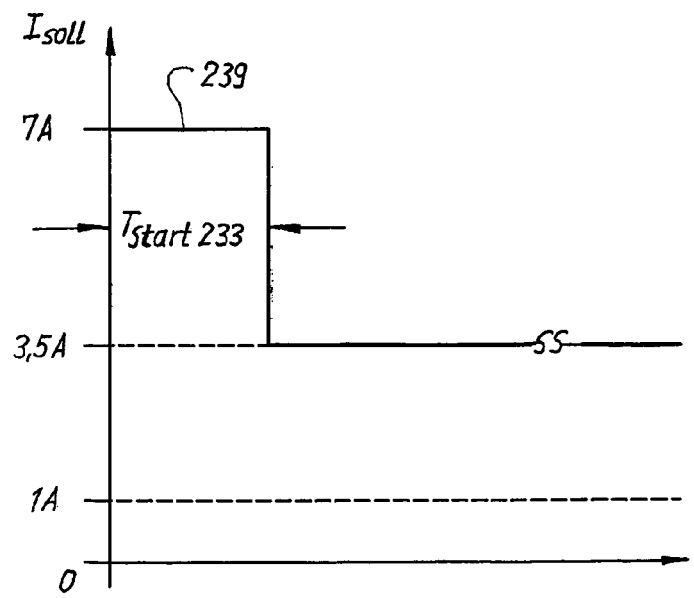

FIG. 7 schematically depicts, using an example, the change in upper limit $I_{soll}$ for the motor current as a function of various operating parameters;

FIG. 8 shows curves that indicate, for the exemplary embodiment indicated, the rise in the upper current limit with increasing rotation speed; the lower curve Iw shows the rotation-speed-dependent rise in that upper limit, and the upper curve Iwmax shows the rotation-speed-dependent rise in the upper limit onto which is also overlaid an additional increase due to activation of an arrangement that is labeled 260 in FIGS. 5 and 6;

FIG. 9 is a diagram to explain the manner of operation of PWM generator 56 in FIGS. 5 and 6;

FIG. 10 is a diagram similar to FIG. 9 that shows events in the context of a temporary increase in the upper current limit;

FIG. 11 is a diagram showing a variant of the arrangement according to FIGS. 5 and 6; and FIG. 12 is a diagram to explain the mode of operation of FIG. 11.

In the description below, identical or identically functioning parts are labeled with the same reference characters and are usually described only once.

Figure 1:
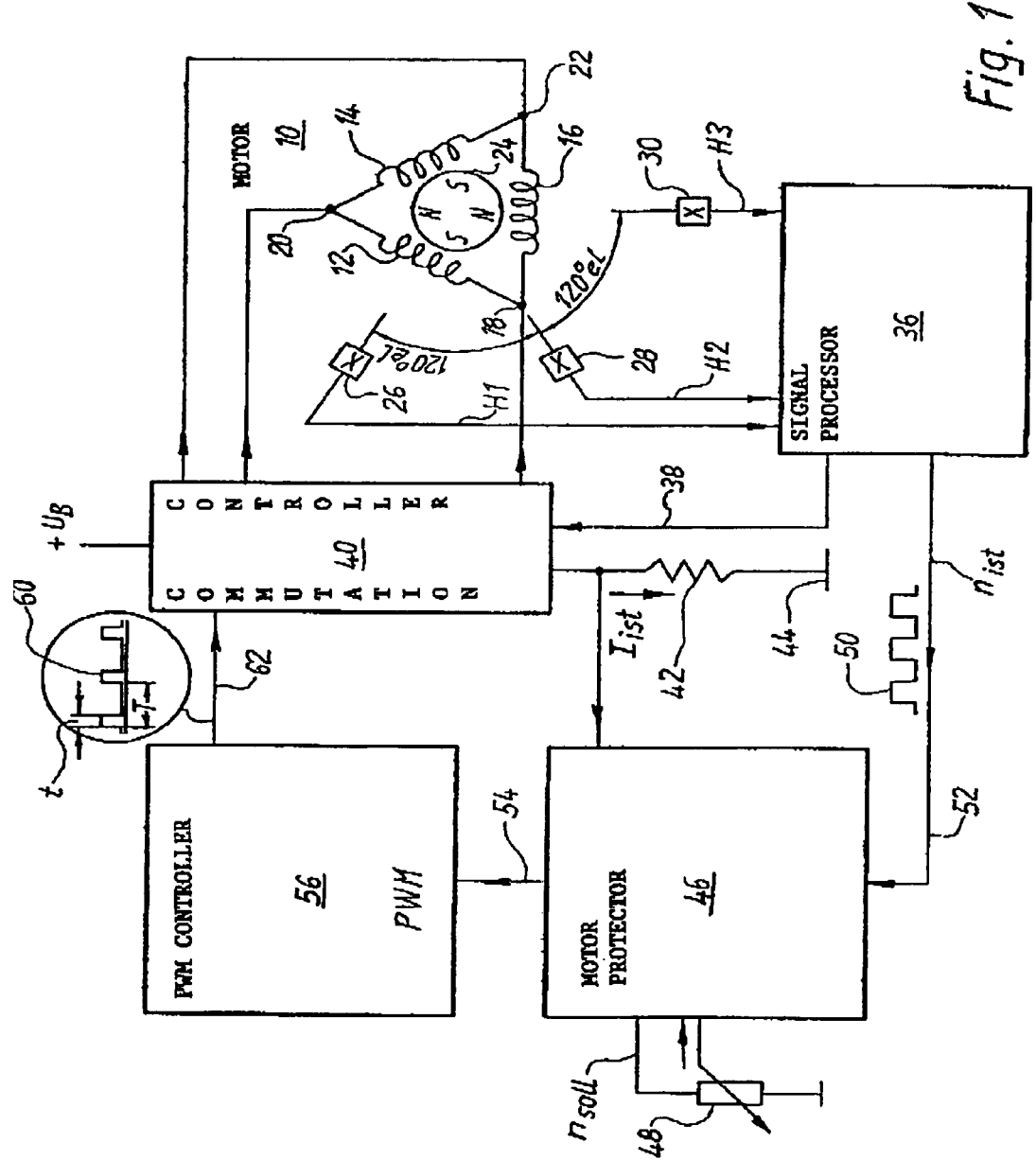
FIG. 1 is an overview circuit diagram to explain the invention.

FIG. 1 is an overview circuit diagram comprising an electronically commutated motor (ECM) 10, here (as an example) a motor having three phases 12, 14, 16 in delta configuration with terminals 18, 20, 22 and a permanent-magnet rotor 24. The latter is depicted, for example, as having four poles. It controls three Hall generators 26, 28, 30 that have angular spacings of 120 degrees el. and generate, during operation, signals H1, H2, H3 that, as shown in FIGS. 4A through 4C, are each phase-shifted 120 degrees from one another. These signals serve for rotation speed measurement and to control the currents through phases 12, 14, 16. ECM 10 is preferably an external-rotor motor.

Figure 2:
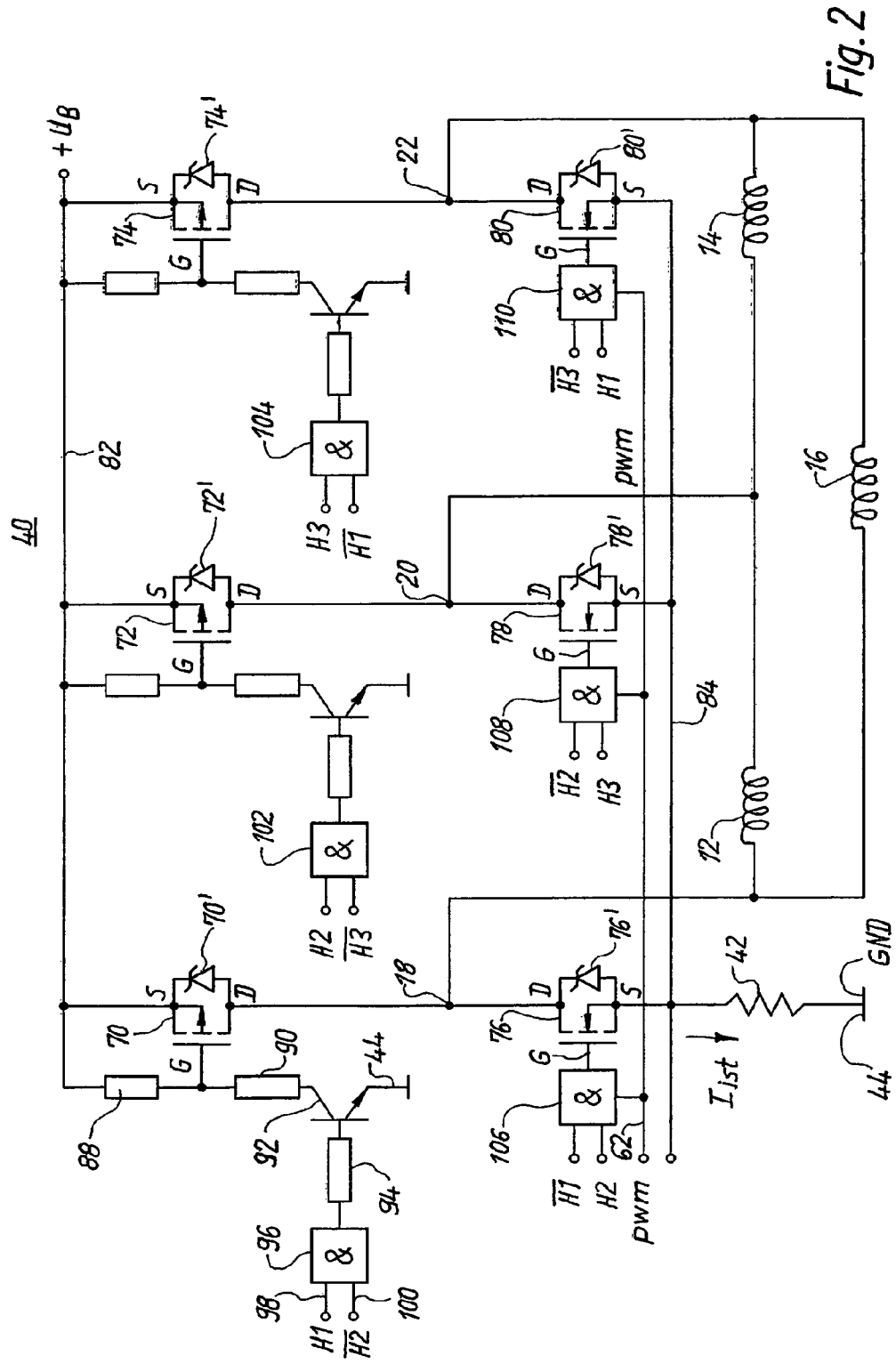
FIG. 2 shows an example of a full bridge circuit for a three-phase motor.
Figure 3:
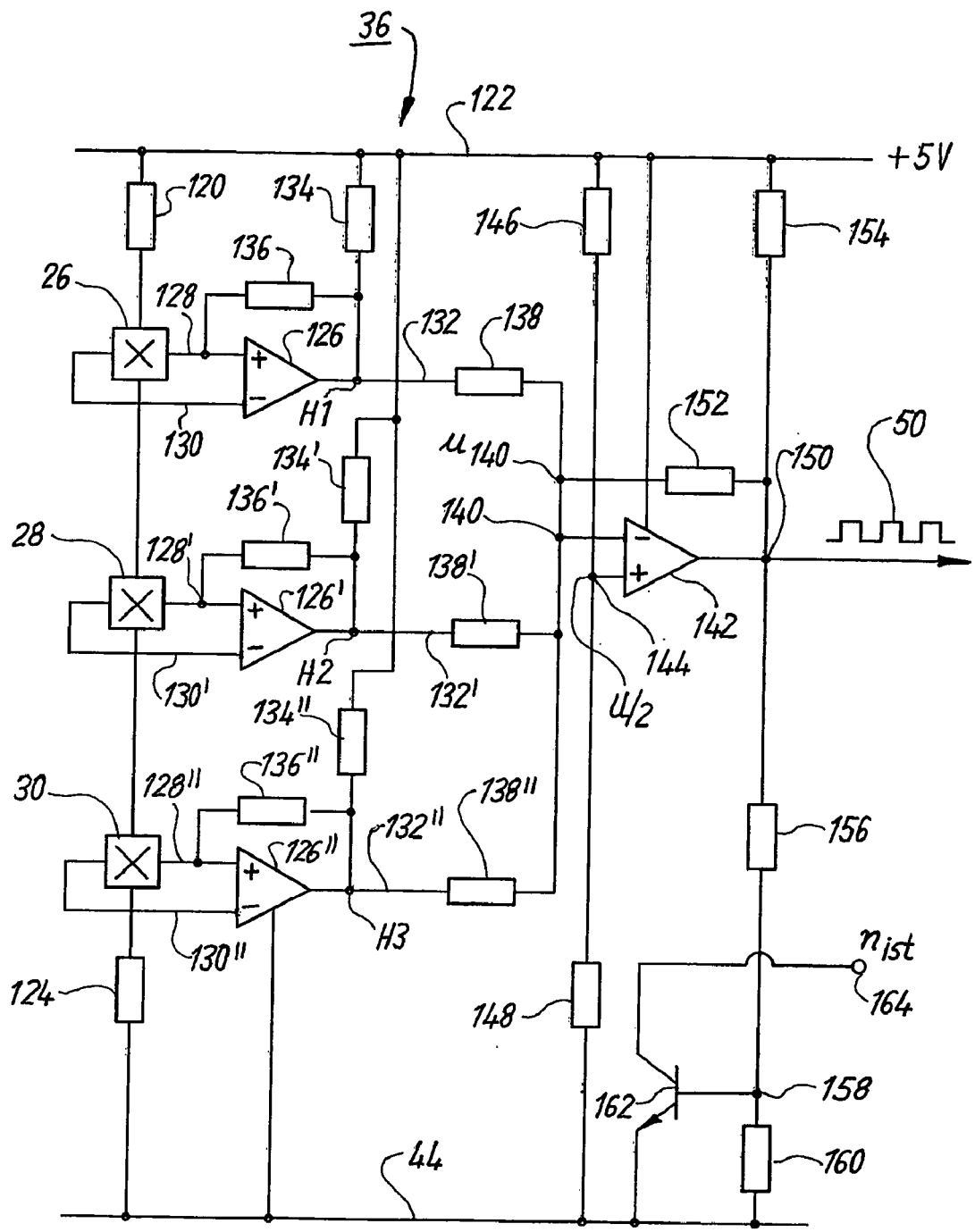
FIG. 3 shows a circuit for generating a signal 50 having a rotation-speed-dependent frequency whose frequency is three times as great as the frequency of the motor's Hall signals from which signal 50 is derived.

Signals H1, H2, H3 are conveyed to a signal processor 36, which is depicted in FIG. 3 and whose output signals are conveyed through a schematically depicted connection 38 to an output stage 40 that is depicted in FIG. 2 and contains a control logic unit for controlling the currents in phases 12, 14, 16. Terminals 18, 20, 22 are connected to output stage 40. The latter is connected to an operating voltage +U$_B$, e.g. to +24 V, +48 V, +60 V or the like, and is connected via a current measuring resistor 42 to ground 44. All the current of motor 10, which is labeled I$_{ist}$ (actual current value), flows through resistor 42.

A voltage drop occurs during operation at resistor 42, and is conveyed to an apparatus 46 which limits current I$_{ist}$ and serves as a dynamic motor protector. A rated speed n$_{soll}$ for motor 10 can be set at this apparatus using a potentiometer 48.

Apparatus 46 has conveyed to it via lead 52 a signal 50 that has three times the frequency of signals H1, H2, H3 and is created in signal processor 36.

An output signal from apparatus 46 is conveyed through a signal connection 54 to a PWM controller 56 which, as a function of the signal at connection 54, supplies a PWM signal 60. The latter has a frequency f of, for example, 25 kHz, corresponding to a period T=0.04 ms. This signal 60 has a pulse duty factor $$pwm = t/T \qquad (1)$$

that is between 0 and 100% depending on the magnitude of the signal at input 54. Signal 60 is conveyed through a connection 62 to output stage 40.

Apparatus 46 preferably has the basic function, usual in such motors, of regulating the rotation speed to a desired value, e.g. to 10,000 rpm, and also limiting motor current I$_{ist}$ to a predetermined value that, as shown in FIG. 8, is e.g. approximately 4.2 A at 10,000 rpm.

At start-up, apparatus 46 is intended to limit the current briefly (e.g. for 0.5 s) to a higher value, for example to 7 A according to FIG. 7 or 12.

If greater loads occur briefly, apparatus 46 is intended to absorb those load increases by permitting a higher current of 5.5 A, for example, for one second, including at start-up; segments having a "normal" current of 3.5 A and lasting for example, 4 s are always intended to be present between these higher currents (5.5 A).

Lastly, when motor 10 is stalled (i.e. at a rotation speed of zero) the current is to be decreased to a low value, e.g. to 1.3 A, so that motor 10 does not overheat when at a standstill.

Furthermore, as shown in FIG. 8, in the case of an external-rotor motor 10 the permissible current I$_{soll}$ (I$_w$ in FIG. 8) is intended to rise with rotation speed n, since an external-rotor motor in particular is cooled better with increasing rotation speed and therefore "tolerates" a higher current when running at high speed.

These functions naturally do not all need to be implemented in a specific motor 10 and can instead also be used only in part, and the numbers indicated are merely examples to facilitate comprehension.

FIG. 2 shows the essential elements of power section 40. The latter contains a full bridge circuit comprising three upper transistors 70, 72, 74 that are implemented as p-channel MOSFETs, and three lower transistors 76, 78, 80 that are implemented as n-channel MOSFETs. A recovery diode 70', 72', 74', 76', 78', 80' is connected antiparallel with each of these transistors.

In upper transistors 70, 72, 74, source S is connected via a lead 82 to +UB. In lower transistors 76, 78, 80, source S is connected to a bus 84 that is connected via measuring resistor 42 to ground 44, so that all of the motor current flows through resistor 42.

Drain terminals D of transistors 70 and 76 are connected to winding terminal 18 of motor 10, D terminals of transistors 72 and 78 to winding terminal 20, and D terminals of transistors 74 and 80 to terminal 22. When transistor 70 and transistor 78, for example, are conductive, a current flows from left to right through phase 12, and a smaller current flows through the series circuit of phases 16 and 14. The magnitude of these currents depends substantially on the voltages that are induced in these phases by the rotating rotor 24 (FIG. 1).

The individual transistors 70 through 80 are switched on via AND elements. According to FIG. 4, for example, between 0 degrees el. and 60 degrees el.:

H1=1, H2=1, H3=0, or in abbreviated fashion HS=110.

In this case transistors 72 through 80 are controlled as follows:

Transistors 70, 74, 76, 78=0.

Transistors 72, 80=1.

This is done by way of the AND elements depicted in FIG. 2. With the combination H1=1 and H3=0, transistor 80 is switched on; with the combination H2=1 and H3=0, transistor 72 is switched on. The other transistors remain blocked.

Similarly, between 60 degrees el. and 120 degrees el., HS=101.

In this case transistors 70 and 78 are switched on and the remaining transistors 72, 74, 76, and 80 are blocked.

The switching state of full bridge circuit 70 through 80 is thereby advanced after each 60 degrees el. so that winding phases 12, 14, 16 generate a rotating electromagnetic field in known fashion, as is common practice for such motors.

For this purpose, in transistor 70 gate G is connected via a resistor 88 to lead 82 and via a resistor 90 to the collector of an npn transistor 92 whose emitter is connected to ground and whose base is connected via a resistor 94 to the output of an AND element 96 that delivers a positive signal at its output (and thereby makes transistors 92 and 70 conductive) when a signal H1=1 is present at input 98 of AND element 96, and a signal H2/=1 (corresponding to H2=0) is present at input 100.

In the same fashion, transistor 72 is made conductive by an AND element 102 when the values H2=1 and H3=0 are present at that element 102.

Transistor 74 is made conductive by an AND element 104 when signals H3=1 and H1=0 are present at that element.

Lower transistor 76 is made conductive, by an AND element 106 having three inputs, when H2=1, H1=0, and (at lead 62) PWM signal 60=1, i.e. PWM signal 60 switches on and off that particular lower transistor 76, 78, 80 that is presently being made conductive by the combination of signals H1, H2, H3.

An AND element 108 that is activated by H2=0, H3=1, and PWM signal 60=1 serves to control transistor 78; and an AND element 110 that is activated by H3=0, H1=1, and PWM signal 60=1 serves to control transistor 80.

The commutation system shown in FIG. 2 is merely an example for better comprehension of the invention.

FIG. 3 shows circuit 36 for creating signal 50 having three times the frequency of signals H1, H2, H3. A particular advantage of this circuit is that it is effective down to a rotation speed of zero, and that the frequency tripling permits a better measurement of the rotation speed of motor 10 and optimum adaptation of the current limitation operation to the instantaneous rotation speed of that motor.

As FIG. 3 shows, the current inputs of the three Hall generators 26, 28, 30 are connected in series. The upper current input of Hall generator 26 is connected via a resistor 120 to a lead 122 (e.g. +5 V), and the lower current terminal of lower Hall generator 30 is connected via a resistor 124 to ground 44. Resistors 120, 124 are preferably approximately the same size.

Associated with Hall generator 26 is a comparator 126 to whose two inputs 128 (+) and 130 (−) are connected the two outputs of Hall generator 26. Output 132 of comparator 126 is connected via a pull-up resistor 134 to positive lead 122, via a resistor 136 to input 128, and via a resistor 138 to negative input 140 of a comparator 142.

As FIG. 3 shows, Hall generator 28 has a comparator 126' and Hall generator 30 has a comparator 126". The circuit is the same in each case, and therefore the same reference characters are used (i.e. for example 128, 128', and 128") and these parts will not be described again.

Positive input 144 of comparator 142 is connected via a resistor 146 to lead 122 and via a resistor 148 to ground 44.

Output 150 of comparator 142 is connected to input 140 via a resistor 152 which effects a switching hysteresis; to lead 122 via a resistor 154; and to ground 44 via a resistor 156, a node 158, and a resistor 160.

Connected to node 158 is the base of an npn transistor 162 whose emitter is connected to ground 44 and whose collector is connected to an output 164 at which a pulse train, having a frequency that is proportional to the instantaneous rotation speed $n_{ist}$ of motor 10, can be picked off.

Preferred Values for FIG. 3

| | |
|---|---|
| Comparators 126, 126', 126", 142 | 4 × LM 2901 |
| Resistors 120, 124 | 200 ohm |
| Resistors 136, 136', 136" | 220 k |
| Resistors 134, 134', 134", 154 | 3.3 k |
| Resistors 138, 138', 138", 146, 148, 156 | 33 k |
| Resistor 152 | 1 M |
| Resistor 160 | 10 k | k = kilohm; M = megohm

Mode of Operation of FIG. 3

The two resistors 146, 148, which are the same size, set input 144 of comparator 142 to approximately +2.5 V.

Figure 4:
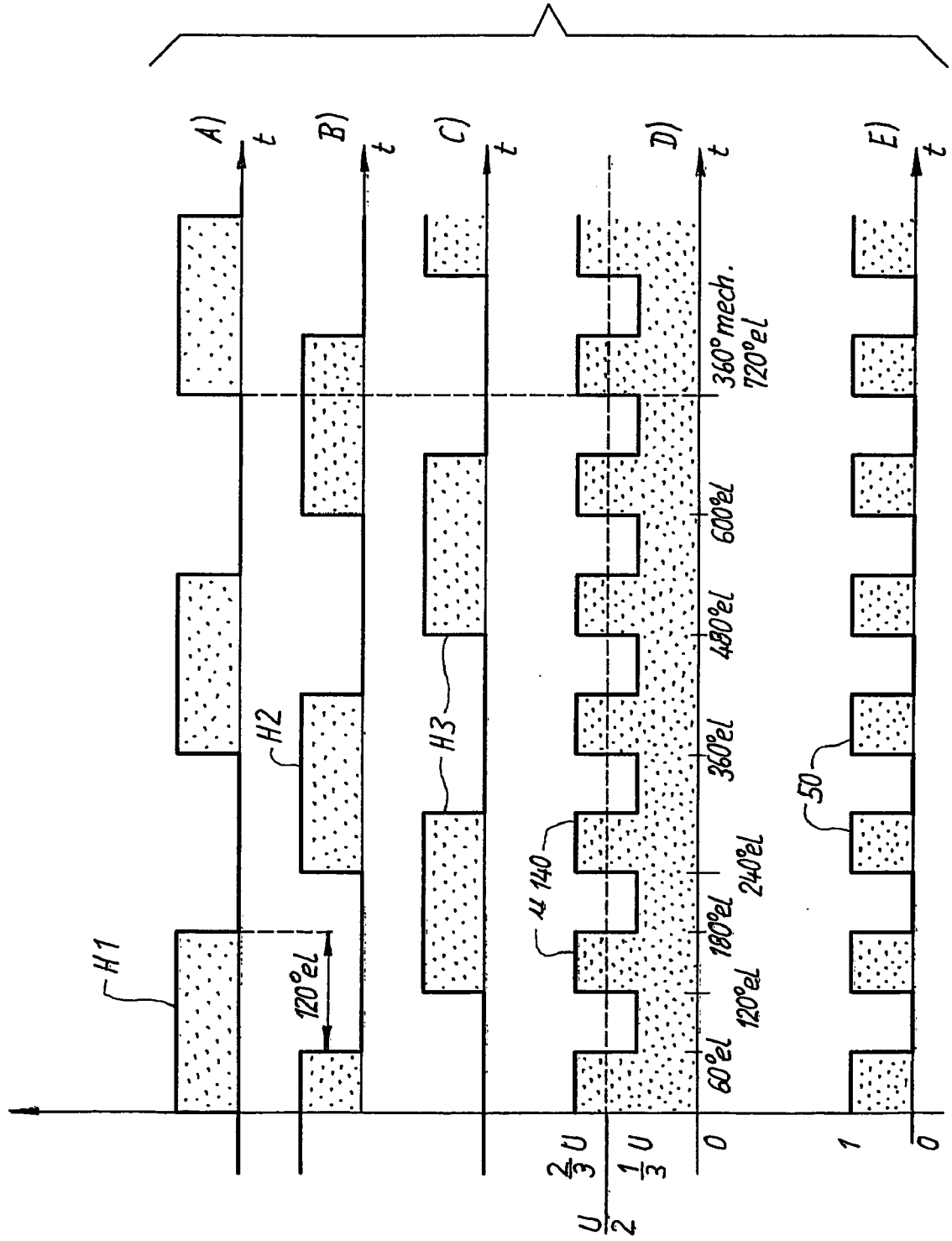
FIG. 4 is a diagram to explain the manner of operation of FIG. 3.

In the range 0 to 60 degrees el., FIG. 4 shows that H1=1, H2=1, H3=0. The output of comparator 126" is consequently connected to ground and the outputs of comparators 126, 126' are not connected to ground, so that a current flows from lead 122 through resistors 134, 138, and 134', 138' to node 140 and from there through resistor 138" to ground 44.

As shown in FIG. 4D, this results in a potential at node 140 equal to approximately two-thirds of voltage U=5 V, and comparator 142 receives at its output 150 a high signal that is labeled 1 in FIG. 4E.

In the range 60 to 120 degrees el., FIG. 4 shows that H1=1, H2=0, H3=0, i.e. the outputs of comparators 126', 126" are connected to ground and the output of comparator 126 is high-resistance. A current then flows from lead 122 through resistors 134, 138 to node 140, and from there through resistor 138' to ground, likewise through resistor 138" to ground. As shown in FIG. 4D, this results in a potential at node 140 equal to approximately one-third of voltage U=5 V, and comparator 142 consequently receives at its output 150 a low signal that is labeled 0 in FIG. 4E.

In this fashion, after each 60 degrees el. the potential at output 150 jumps either from 0 to 1 or from 1 to 0, and signal 50 whose frequency is three times the frequency of signals H1, etc. is obtained there. That signal is also available at output 164, e.g. for monitoring the rotation speed of motor 10. Such monitoring is requested by many customers.

FIG. 5 is an overview to explain the basic aspects of the invention. The voltage at measuring resistor 42 is conveyed through a resistor 207 and a smoothing capacitor 208 to negative input 210 of a comparator 204 whose output is labeled 216. Positive input 212 of comparator 204 is connected to a node 214 whose potential determines the upper limit of the current in motor 10, i.e. its available power. If that upper limit is exceeded, the pulse duty factor of pulses 60, which are generated by a PWM generator 56, is automatically reduced.

Node 214 is connected via a resistor 240 to ground 44, via a resistor 238 to a node 232, and via a resistor 300 to switch 286 of a timing member 260 that is connected via a capacitor 262 to output 216 of comparator 204.

Node 232 is connected to lead 122 via a resistor 234 and a capacitor 236 parallel to the latter. It is also connected via a resistor 230 to the collector of a pnp transistor 226 whose emitter is connected to lead 122 and to whose base a rotation-speed-dependent signal f(n) is conveyed.

Output 216 is connected via a resistor 202 (having a value R2) to the input of PWM generator 56, to which a rotation-speed-determining signal ("n signal") is also conveyed, usually from a rotation speed controller or a manual rotation speed adjuster, via a resistor 196 having a value R1. Resistance value R1 is substantially greater than R2. Typical values yielding a preferred ratio of R1 to R2 will be indicated below.

PWM generator 56 supplies, at an output 190, PWM signal 60 that is conveyed through lead 62 (see FIGS. 1 and 2) to commutation controller 40.

Mode of Operation of FIG. 5

As long as potential $u_{210}$ at input 210 of comparator 204 is lower than potential $u_{212}$ at its input 212, output 216 of comparator 204 is high-resistance and has no influence on modules 56 and 260 connected to it. This is the case as long as motor current $I_{ist}$ is lower than an upper limit value that is defined by potential $u_{212}$ of node 214.

That potential is in turn determined by the ratio among resistors 234, 238, 240 and by a rotation-speed-dependent current 248 that flows through transistor 226 and resistor 230 to node 232, the potential at node 232 being smoothed by capacitor 236. Potential $u_{212}$ at node 214, and consequently also the upper limit of current $I_{ist}$, thus rises with increasing rotation speed.

If current $I_{ist}$ becomes too high, comparator 204 flips and its output 216 is connected to ground 44. The potential change thereby occurring at output 216 is transferred through capacitor 262 to timing member 260 and switches on switch 286, for example for one second, so that resistor 300 is connected in parallel with resistors 234, 238 and potential $u_{212}$ of node 214 is raised for that one second so that output 216 of comparator 204 immediately becomes high-resistance again and current $I_{ist}$ can once again rise. After that one second has elapsed, switch 286 opens and potential $u_{212}$ at node 214 drops back, causing current $I_{ist}$ once again to be limited to a lower value. If output 216 is connected to ground in this context, a current flows from input 194 through resistor 202 and comparator 204 to ground 44, thereby abruptly reducing the potential of input 194. Pulse duty factor pwm (equation 1) of PWM signal 60 is thereby also immediately reduced in order to reduce motor current $I_{ist}$ and keep it below the desired upper limit. The frequency of signal 60 remains unchanged in this context, which is an important advantage.

To ensure that the increase in the potential at node 232 and thus also at node 214 is as great as possible, resistor 234 is preferably selected to be substantially larger than the sum of resistors 238 and 240. The voltage drop at current measuring resistor 42 is kept as low as possible. Potential value $u_{212}$ at node 214 for upper current limit $I_{soll}$ is thus also low, and because resistor 300 is connected in parallel it is easily possible to double upper current limit $I_{soll}$ if so desired.

At start-up, capacitor 236 is discharged and acts then as a short-circuit for resistor 234, so that at startup, potential $u_{212}$ of node 214 is raised until capacitor 236 has charged. The starting current of motor 10 can thereby be greatly increased for a short time in order to ensure reliable starting, as depicted in FIG. 7 at 252. A longer-duration increase is possible with the variant shown in FIGS. 11 and 12.

One important aspect of the present invention is therefore voltage divider 234, 238, 240, to which, as a function of motor parameters, signals of various kinds are conveyed from outside in order to limit or optimally utilize the available power of motor 10. The various external influences on this voltage divider that are described represent, of course, only examples of the many possibilities offered by this principle.

FIG. 6 shows details of a preferred embodiment of FIG. 5. The same reference characters as in FIG. 5 are used for parts identical, or identical in function, to parts in that Figure. PWM generator 56 contains a triangular signal generator having a comparator 170 whose positive input 172 is connected via a resistor 174 to lead 122 (+5 V), via a resistor 176 to output 178, and via a resistor 180 to ground 44. Output 178 is connected via a resistor 181 to lead 122 and via a resistor 182 to negative input 184, which is also connected to the negative input of a comparator 186 and, via a capacitor 188, to ground 44. PWM signal 60 is generated at output 190 of comparator 186. Output 190 is connected via a pull-up resistor 192 to lead 122.

Comparator 170 with its various circuit elements generates a triangular voltage $u_{184}$ (see FIG. 9) at, for example, 25 kHz at input 184, and that voltage is conveyed to comparator 186.

The output signal, for example, of a rotation speed controller 200 (indicated only schematically) is conveyed, as potential $u_{194}$, to positive input 194 via resistor 196, and input 194 is connected via resistor 202 to the output of comparator 204, which is a constituent of an arrangement for current limiting.

The voltage at measuring resistor 42, determined by motor current $I_{ist}$, is conveyed through resistor 207 and filter capacitor 208 to negative input 210 of comparator 204, as already described with reference to FIG. 5. The latter's positive input 212 is connected to node 214, and potential $u_{212}$ there determines current $I_{soll}$ at which the current limiting arrangement is activated: the current is limited to a high value if the potential at node 214 is high, and to a low value if it is low.

Specifically, if current $I_{ist}$ becomes sufficiently high that potential $u_{210}$ of input 210 becomes higher than potential $u_{212}$ of input 212, comparator 204 flips and its output 216 goes to ground potential, so that a current flows from input 194 through resistor 202 to ground; as a result, potential $u_{194}$ at input 194 of comparator 186 abruptly decreases, pulse duty factor pwm of pulses 60 consequently becomes lower, and current $I_{ist}$, is thus reduced because transistors 76, 78, 80 are switched on and off at that pulse duty factor, as described with reference to FIG. 2.

FIG. 9 shows triangular voltage $u_{184}$ that is furnished by comparator 170 which serves as the triangular signal generator. This triangular voltage is compared in comparator 186 with potential $u_{194}$ at input 194 of that comparator.

If motor current $I_{ist}$ at time $t_{10}$ is higher than the predetermined value $I_{soll}$, comparator 204 flips, its output 216 becomes LOW, and a current flows through resistor 202 to ground 44 so that potential $u_{194}$ makes a downward jump 195 at time $t_{10}$.

The result, as depicted in FIG. 9B, is that as of time $t_{10}$ the pulses of PWM signal 60 become shorter, and motor current $I_{ist}$ consequently decreases until it is once again lower than $I_{soll}$. When that situation exists, comparator 204 flips back into its other state in which its output 216 is high-resistance, and no further current flows through resistor 202.

A negative potential change at output 216 causes a transistor 264 to switch on and results in a temporary raising of upper current limit $I_{soll}$ as depicted in FIG. 7 at 304, and in this situation the length of pulses 60 temporarily increases again.

Controlling pulses 60 exclusively by way of pulse duty factor pwm, using a fixed frequency for PWM signal 60, is very advantageous because, for example, it is possible always to work at 20 kHz or higher. That frequency lies beyond the range of human hearing, and motor 10 thus becomes quieter.

An arrangement 220 serves to increase the potential at node 214 (see FIG. 8) in rotation-speed-dependent fashion. Pulses 50 (at tripled frequency) are conveyed through the series circuit of a capacitor 222 and a resistor 224 to the base of a pnp transistor 226 that is connected via a resistor 228 to lead 122, to which the emitter of transistor 226 is also connected. The collector of this transistor 226 is connected via a resistor 230 to a node 232, which is connected to lead 122 (+5 V) via a resistor 234 and a capacitor 236 parallel thereto. Node 232 is likewise connected via a resistor 238 to node 214, and the latter is connected via a resistor 240 to ground 44.

Resistors 234 (430 k), 238 (100 k) and 240 (8.2 k) constitute a voltage divider, and in the steady state, when no external influences are acting on the voltage divider, the potential of ground 44 is 0 V, node 214 0.076 V, node 232 1 V, and lead 122 +5 V.

Potential $u_{212}$ at node 214 determines the upper current limit to which motor current $I_{ist}$ is limited—for example, according to FIG. 8, to approx. 4.2 A at 10,000 rpm in continuous operation. This potential $u_{212}$ is conveyed to positive terminal 212 of comparator 204; when it is low, comparator 204 already switches over at a low current $I_{ist}$ and reduces potential $u_{194}$ at input 194 of comparator 186, thereby already reducing pulse duty factor pwm (equation 1) of pulses 60 at a low motor current $I_{ist}$.

Raising the Current Limit as a Function of Rotation Speed

Arrangement 220 (FIG. 6) causes a current pulse 248 of constant pulse width to be generated at each pulse 50 (FIG. 4E). A particularly advantageous approach to achieving the constant pulse duration of current pulses 248 is to connect the base of transistor 226 to capacitor 222, resistor 224, and resistor 228. The pulse duration is determined by the product of the capacitance of capacitor 222 and the sum of the values of resistors 224 and 228, i.e. C222*(R224+R228). Current pulses 248 are conveyed to node 232, so that an additional current 248 flows through resistors 238, 240 and raises the potential of node 214. This additional current 248 does not flow, however, when motor 10 is stalled, resulting in a low motor current when the motor is stalled.

Since more pulses 50 and 248 are generated per unit time as the rotation speed increases, this additional current through resistors 238, 240 rises with increasing rotation speed so that the upper current limit rises with increasing rotation speed.

To ensure that the potential at node 232 and therefore also at node 214 is raised as much as possible, resistor 234 is preferably selected to be very much larger than the sum of resistors 238 and 240.

Dynamic Current Raising in Response to Load Surges

An ECM 10 is designed so that it has a power reserve, i.e. its temperature is almost unaffected if increased power is demanded of it for only a brief time. If that same increased power were required from motor 10 on a continuous basis, however, it would overheat and be destroyed as a result.

It is thus very preferable to use dynamic current raising for load surges. This is accomplished with part 260 in FIG. 6, whose function has already been explained with reference to FIG. 5.

Output 216 of comparator 204 is connected via a capacitor 262 to the base of a pnp transistor 264 that in turn is connected via a resistor 266 to lead 122. The collector of transistor 264 is connected to ground 44. Its emitter is connected via a resistor 268 to lead 122, via a resistor 270 to a node 272, and directly to negative input 274 of a comparator 276. Node 272 is connected via a resistor 278 to positive input 280 of comparator 276, and via a resistor 282 to ground 44.

Output 284 of comparator 276 is connected to the base of an npn transistor 286, also via a resistor 288 to lead 122 and via a capacitor 290 to a node 292, which in turn is connected to positive input 280 via a resistor 294 and to ground 44 via the series circuit of a resistor 296 and a diode 298.

The collector of transistor 286 is connected to lead 122, and its emitter via resistor 300 to node 214.

When transistor 286 is conductive, resistor 300 (180 k) is connected in parallel with the series circuit of resistors 234 and 238; the result is that potential $u_{212}$ at node 214 jumps to a higher value, and the upper current limit is raised as shown in FIG. 7, e.g. from 3.5 to 5.5 A.

If motor current $I_{ist}$ is too high, comparator 204 flips to LOW; this potential change is transferred through capacitor 262 to the base of pnp transistor 264 and makes it conductive, so that it bypasses resistors 270, 282 and switches over comparator 276, which is connected as a monoflop. Transistor 264 suppresses the positive pulses that are produced upon differentiation by capacitor 262, so that only the negative pulses can cause comparator 276 to switch over.

Output 284 of comparator 276 is LOW in the idle state. When the monoflop is triggered, output 284 becomes HIGH for a period defined by components 290, 296, 298 and then flips back to LOW.

As long as output 284 is high, transistor 286 is switched on and an additional current flows through it and resistor 300 to node 214, as already described. Transistor 286 acts in this context as an ideal switch, i.e. resistor 300 is decoupled from node 214 when transistor 286 is blocked.

The time during which output 284 is high is here approximately 1 second, and it is followed in each case by a period of at least 4 seconds during which output 284 is LOW; this results, as shown by FIG. 7, in short segments 304 of higher current separated from one another by long segments 306 of lower current. This prevents overloading of motor 10, but allows adaptation to short-duration load surges that can occur in many drive systems.

When rotor 24 of motor 10 is stalled, the current limiting arrangement is continuously active, i.e. comparator 204 is continuously flipped, so that no pulses are transferred through capacitor 262 and circuit 260 is not activated.

No further pulses 50 are generated when rotor 24 is stalled, meaning also that no further current pulses 248 are generated. The current then drops as indicated by segment 308 of FIG. 7, and at a standstill is limited to a low value 310 in order to prevent overheating of ECM 10 when it is stalled.

FIG. 10 schematically depicts, for FIGS. 5 and 6, motor current $I_{ist}$ represented by potential $u_{210}$ at input 210 of comparator 204, upper current limit $I_{soll}$ represented by potential $u_{212}$ at input 212 of comparator 204, and potential $u_{216}$ at output 216 of comparator 204 in the event that upper current limit $I_{soll}$ is exceeded.

Upper current limit $I_{soll}$ is exceeded at time $t_{20}$. As a result, comparator 204 switches to LOW and monoflop circuit 260 is activated (see description of FIG. 5) so that upper current limit $I_{soll}$ is raised for the period $T_1$ (e.g. 1 second) determined by monoflop circuit 260. Potential $u_{216}$ thus becomes high again at time $t_{21}$.

At time $t_{22}$ motor current $I_{ist}$ has returned to its normal level, for example because the brief additional load or interference is no longer present. Monoflop circuit 260 is deactivated after time period $T_1$, and upper current limit $I_{soll}$ returns to its original value. No further current excursions occur until time $t_{24}$.

At time $t_{24}$ upper current limit $I_{soll}$ is once again exceeded, and output 214 is switched to LOW. Since monoflop circuit 260, after completion of the upper current limit raising, does not permit a further raising for a period $T_2$ of, for example, 4 seconds (in order to protect the motor from overheating), the current excursion has no effect until time $t_{26}$. Motor current $I_{ist}$ cannot rise further. Between $t_{24}$ and $t_{26}$, as depicted, potential $u_{216}$ oscillates continuously between HIGH and LOW because here the current limiting function acts based on the present value of $I_{soll}$.

At time $t_{26}$ motor current $I_{ist}$ drops back, in this example, below upper current limit $I_{soll}$ and output 216 goes back to HIGH.

At time $t_{28}$ upper current limit $I_{soll}$ is once again exceeded. Because time period $T_2$ has not yet elapsed, the upper current limit is not raised. That does not occur again until time $t_{30}$, at which time period $T_2$ has elapsed. Starting at $t_{30}$, upper current limit $I_{soll}$ is once again raised for time period $T_1$. Motor current $I_{ist}$ can thus briefly rise back to a higher value, as depicted at A.

At time $t_{32}$ motor current $I_{ist}$ drops back into the normal range, and potential $u_{216}$ therefore becomes continuously high again. Time span $T_1$ ends at time $t_{34}$, and the upper current limit is lowered back to the normal value.

The mode of operation of the arrangement of FIGS. 5 and 6 is based partly on the fact that potential $u_{212}$ at node 214, which defines the upper current limit, is modified as a function of certain operating conditions so that it becomes either higher or lower; consequently the motor current is automatically limited, as a function of operating parameters of the motor, to various values in order to optimize utilization of the output capabilities of ECM 10.

FIG. 8 shows, as an example, the raising of the upper current limit in a motor that is designed for a rotation speed of approximately 10,000 rpm.

If the motor is stalled (rotation speed n=0), the motor current is limited to a value of approximately 1.4 A. Upper current limit Iw=f(n) rises to approximately 4.2 A at 10,000 rpm. The curve becomes flatter in the upper region and reaches a plateau; this flat region is placed, by the selection of electrical components 222, 224, 228, 230, in the vicinity of the motor's rated speed.

FIG. 8 also shows a curve Iwmax corresponding to the raised upper current limit resulting from the activation of monoflop 260. This causes the upper current limit at 10,000 rpm to be increased, for example, from approximately 4.2 to approximately 4.8 A; there is a corresponding increase in torque M, which is shown in FIG. 8 on the left-hand scale and is proportional to the actual motor current. Since an external-rotor motor is effectively cooled at 10,000 rpm by the air turbulence that is generated, it can dissipate substantially more waste heat at that rotation speed than at a standstill, and the permissible motor current can therefore be substantially higher at 10,000 rpm than when the motor is stalled. This makes it possible to achieve higher rotation speeds, and thus greater power, with a motor of predetermined size.

It is also possible in the context of the invention to temporarily switch off the motor current completely when the motor is stalled, and to attempt a restart at regular time intervals.

Capacitor 236 at node 232 effects a smoothing of the potential at that node, resulting in a stable target value at comparator 204.

Arrangement 220 is thus particularly advantageous for external-rotor motors, but can of course be used in all motors in which cooling improves with increasing rotation speed.

Current Raising at Start-Up

Capacitor 236 (1.5 [mu]F) has the additional function of being discharged at start-up and functioning briefly at that time as a short circuit for resistor 234. The potential at node 232 is thereby briefly raised to +5 V, and the potential at node 214 rises to 0.38 V so that current $I_{ist}$ is limited to a high value. This is shown in FIG. 7 at 252, where after start-up the current limit drops within 0.5 second from 7 A to 5.5 A, so that motor 10 can start at a very high torque that is nevertheless quickly reduced.

The duration $t_{START}$ of the starting pulse is defined approximately as:

$$t_{START}=C_{236}*R_{234}*(R_{238}+R_{240})/(R_{234}+R_{238}+R_{240}) \qquad (2)$$

Preferred Values of Components in FIG. 6

| | |
|---|---|
| Capacitor 222 | 3.3 nF |
| Resistors 224, 228 | 51 k |
| Transistors 226, 264 | BC857 |
| Transistor 286 | BC847 |
| Comparators 170, 186, 204, 276 | 4 × LM2901 |
| Resistor 230 | 11 k |
| Resistor 234 | 430 k |
| Resistors 180, 238 | 100 k |
| Resistor 240 | 8.2 k |
| Resistor 42 | 0.082 ohm |
| Resistor 206 | 1 k |
| Capacitor 208 | 1 nF |
| Resistor 196 | 33 k |
| Resistors 181, 192, 202, 288 | 10 k |
| Capacitor 188 | 220 pF |
| Resistor 182 | 75 k |
| Resistor 176 | 33 k |
| Resistor 174 | 62 k |
| Capacitor 262 | 33 nF |
| Resistor 266 | 22 k |
| Resistor 268 | 45 k |
| Resistor 270 | 3 k |
| Resistor 282 | 2 k |
| Resistors 278, 294 | 1 M |
| Capacitor 290 | 1 [mu]F |
| Resistor 296 | 620 k |
| Diode 298 | 1N4148 |
| Capacitor 236 | 1.5 [mu]F |
| Resistor 300 | 180 k |

Voltage at lead 122 = +5 V, regulated.
Rated speed of motor = 10,000 rpm.
k = kilohm, M = megohm.

FIG. 11 shows a preferred variant of the manner in which the rotation-speed-dependent signal 50 (FIG. 4E) created by circuit 36 (FIG. 3) at its output 150 is conveyed to node 232 for a circuit according to FIG. 5 or FIG. 6. This variant differs from FIG. 6 by having the two components 231, 233. The remaining components are largely identical to FIG. 6 and are therefore not described again. In FIG. 11, the base of pnp transistor 226 is connected to ground 44 via the series circuit of a resistor 231 and a capacitor 233.

At start-up, the previously discharged capacitor 233 is charged through resistors 228 and 231. The voltage drop at resistor 228 during this charging operation makes transistor 226 conductive temporarily, thereby connecting resistor 230 in parallel with resistor 234 so that the potential at node 232 is greatly raised during this period. The duration $T_{start233}$ of this raising is determined approximately by $$T_{start233}=(R_{228}+R_{231})*C_{233} \qquad (3).$$

Pulses 248 (FIG. 6) at a rotation-speed-dependent frequency are then conveyed through resistor 230 to node 232 in order to raise the upper current limit with increasing rotation speed, as described with reference to FIGS. 5 and 6 and depicted in FIG. 8. During $T_{start233}$, the value $I_{soll}$ (which is defined by the potential at node 214) exhibits an elevation in the form of a plateau 239 (FIG. 12) which is overlaid on the elevation due to capacitor 236 and allows a longer start-up raising of upper current limit $I_{soll}$ to be achieved. Greater inert masses can thus be accelerated, and the raised current allows a high dynamic starting torque. At the same time, the motor is protected in the event of stalling, since in such a case transistor 226 is blocked and motor current $I_{ist}$ is limited to a low value (see FIG. 7).

Preferred Values of Components in FIG. 11

| | |
|---|---|
| Capacitor 222 | 1 nF |
| Resistor 224 | 200 k |
| Transistor 226 | BC857 |

-continued

| Capacitor 233 | 1.5 [mu]F |
| Resistors 228, 231, 234 | 430 k |

Operating voltage +5 V; k =0 kilohm

The invention thus concerns a method for operating an ECM 10 that is equipped with a current limiting arrangement. The latter acts on a PWM controller that, during operation, delivers PWM pulses having a controllable pulse duty factor pwm and a substantially constant frequency. If a predetermined upper limit $I_{soll}$ for the motor current is exceeded, the current limiting arrangement causes a modification of pulse duty factor pwm for pulses 60 delivered by PWM controller 56 in order to reduce the motor current. If the motor current exceeds a predetermined upper limit value $I_{soll}$ while the ECM is rotating, that limit value is raised for a predetermined time period 304 (FIG. 7), and as a result the maximum available motor power is temporarily raised—usually for a few seconds—in the event of a load peak. If rotor 24 is stalled, the limit value is not raised but is instead lowered further. Upper limit value $I_w$ is preferably also raised to a plateau as a function of rotation speed n of the motor, as depicted in FIG. 8. The aforesaid features can be applied individually or in any combination.

The invention makes it possible, in very simple fashion, to utilize the power of an ECM 10 in better fashion than before, without requiring a special (thermal) simulation of the motor for that purpose. The definition of upper current limit $I_{soll}$ ($I_w$ in FIG. 8) in the motor's rotation speed range is variable within wide limits. Many other variants and modifications are of course also possible in the context of the present invention.

What is claimed is:

1. A method for operating an electronically commutated DC motor that is equipped with
   a current limiting arrangement which acts on
   a PWM controller that, in operation, delivers PWM pulses (60) having a controllable pulse duty ratio (pwm) and a substantially constant frequency, which current limiting arrangement, in the event a predetermined upper limit value ($I_{soll}$) of the motor current is exceeded, effects a change in the pulse duty factor, of the pulses (60) delivered by that PWM controller in order to reduce the motor current,
   comprising the steps of:
   monitoring whether the motor current ($I_{ist}$) exceeds the predetermined upper limit value ($I_{soll}$) of the current limiting arrangement;
   if the motor current ($I_{ist}$) exceeds the predetermined upper limit value ($I_{soll}$) while the motor (10) is rotating, raising that limit value during a predetermined time span ($T_1$) in order to make more motor power available during that time span.

2. The method according to claim 1,
   wherein said limit value raising by the current limiting arrangement comprises
   generating a signal and transferring said signal to a timing member which, upon its activation by that signal, raises the upper limit value ($I_{soll}$) of the motor current during a predetermined time span in order, in the context of temporary load peaks, to make more power available from the motor (10) by raising the upper limit value ($I_{soll}$).

3. The method according to claim 2, wherein the step of transferring the signal generated upon response of the current limiting arrangement comprises
   transferring the signal to the timing member via an AC voltage coupling.

4. A method of operating an electronically commutated DC motor that is equipped with a current limiting arrangement which acts on a PWM controller that, in operation, delivers PWM pulses (60) having a controllable pulse duty ratio and a substantially constant frequency, which current limiting arrangement, in the event a predetermined upper limit value of the motor current is exceeded, effects a change in the pulse duty factor, of the pulses (60) delivered by that PWM controller, in order to reduce the motor current ($I_{ist}$),
   comprising the steps of:
   specifying the upper limit value by applying a potential at an output of a voltage divider,
   generating at least one current pulse as a function of rotation speed of the motor; and
   applying the at least one current pulse to an input of the voltage divider in order to raise the upper limit value ($I_{soll}$) of the motor current as rotation speed increases.

5. The method according to claim 4, wherein, in proportion to the rotation speed of the motor (10), current pulses (50) are generated that exhibit a substantially constant product of duration and amplitude.

6. The method according to claim 4,
   wherein at start-up, a further current pulse is generated and is fed to the voltage divider in order to raise the upper limit value of the motor current during the duration of that current pulse.

7. A method of operating an electronically commutated DC motor that is equipped with
   a current limiting arrangement which acts on
   a PWM controller that, in operation, delivers PWM pulses (60) having a controllable pulse duty ratio and a substantially constant frequency, which current limiting arrangement, in the event a predetermined upper limit value of the motor current ($I_{ist}$) is exceeded, effects a change in the pulse duty factor, of the pulses (60) delivered by that PWM controller, in order to reduce the motor current ($I_{ist}$),
   a voltage divider including a splitting resistor, and
   a capacitor (236) arranged in parallel with said splitting resistor, comprising the steps of:
   specifying the upper limit value ($I_{soll}$) by applying a potential at an output of the voltage divider,
   placing said capacitor in a discharged state, prior to starting of the motor, and charging said capacitor after starting of the motor (10), said capacitor in its discharged state serving as a short circuit for said splitting resistor (234) and thereby tending to increase said upper limit value, said capacitor, when charged, serving to decrease said upper limit value.

8. The motor according to claim 7, wherein the motor is a brushless electronically commutated external-rotor motor.

9. An electronically commutated motor (10) comprising a rotor (24);
   a stator having (2n+1) winding phases (12, 14, 16) and (2n+1) rotor position sensors (26, 28, 30) for furnishing output signals that, collectively, define a signal combination indicating the instantaneous position of the rotor (24), where n=1, 2, 3, . . . ;
   each rotor position sensor (26, 28, 30) having an output generating a sensor output signal, each sensor having associated with it, for processing of said sensor output signal, a respective comparator (126, 126', 126") having an output (132) furnishing a comparator output signal, which output signal assumes a predetermined first potential when a specific value of said sensor output signal is applied to an input of said comparator; and wherein the output of each comparator (126, 126', 126") is connected via a first resistor (134, 134', 134") to a second potential (122) different from the first predetermined potential, and is connected via a second resistor (130, 138', 138") to an input (140) of a further comparator (142) which is configured to compare a signal ($u_{140}$) at that input (140) with a signal (U/2) of substantially predetermined magnitude and thereby to furnish, at an output (150) of said further comparator, a signal (50) whose frequency is raised in comparison with a frequency of each rotor position output signal generated while the motor (10) is running.

10. The motor according to claim 9, further comprising means for processing said raised frequency signal (50) at the output of the further comparator (142) as a rotation-speed-dependent signal.

11. The motor according to claim 9, wherein the motor is a brushless electronically commutated external-rotor motor.

12. The motor according to claim 10, wherein the motor is a brushless electronically commutated external-rotor motor.

13. An electronically commutated DC motor comprising
a current limiting arrangement which acts on
a PWM controller that, in operation, delivers PWM pulses (60) having a controllable pulse duty ratio (pwm) and a substantially constant frequency, which current limiting arrangement, in the event a predetermined upper limit value ($I_{soll}$) of the motor current is exceeded, effects a change in the pulse duty factor (pwm), of the pulses (60) delivered by that PWM controller, in order to reduce the motor current, and
means for monitoring whether the motor current ($I_{ist}$) exceeds the predetermined upper limit value ($I_{soll}$) of the current limiting arrangement and, if so, for raising the predetermined upper limit value for a predetermined time span ($T_1$), in order to make more motor power available during that time span.

14. The motor according to claim 13, wherein the motor is a brushless electronically commutated external-rotor motor.

15. An electronically commutated DC motor, comprising
a current limiting arrangement which acts on
a PWM controller that, in operation, delivers PWM pulses (60) having a controllable pulse duty ratio (pwm) and a substantially constant frequency, which current limiting arrangement, in the event a predetermined upper limit value ($I_{soll}$) of the motor current is exceeded, effects a change in the pulse duty factor (pwm), of the pulses (60) delivered by that PWM controller, in order to reduce the motor current,
a voltage divider (234, 238, 240) which supplies a potential which specifies the predetermined upper limit value, and
means for generating a plurality of current pulses in proportion to rotation speed and for applying said current pulses to said voltage divider, to thereby increase the upper limit value of the motor current as a function of rotation speed.

16. The motor according to claim 15, wherein the motor is a brushless electronically commutated external-rotor motor.

17. An electronically commutated DC motor that is equipped with
a current limiting arrangement which acts on
a PWM controller that, in operation, delivers PWM pulses (60) having a controllable pulse duty ratio (pwm) and a substantially constant frequency, which current limiting arrangement, in the event a predetermined upper limit value of the motor current ($I_{ist}$) is exceeded, effects a change in the pulse duty factor, of the pulses (60) delivered by that PWM controller, in order to reduce the motor current ($I_{ist}$),
a voltage divider (234, 238, 240), including a splitting resistor, supplying an output voltage which specifies the upper limit value, and
a capacitor (236), arranged in parallel with said splitting resistor, said capacitor being in a discharged state prior to starting of the motor but charging after starting of the motor (10), said capacitor in its discharged state serving as a short circuit for said splitting resistor (234) and thereby tending to increase said upper limit value, said capacitor, when charged, serving to decrease said upper limit value.

* * * * *

UNITED STATES PATENT AND TRADEMARK OFFICE
CERTIFICATE OF CORRECTION

PATENT NO. : 6,982,534 B2
APPLICATION NO. : 10/487461
DATED : January 3, 2006
INVENTOR(S) : Hahn et al.

It is certified that error appears in the above-identified patent and that said Letters Patent is hereby corrected as shown below:

The specification & abstract should read as follows:

Please delete Item (57) and insert Item (57) Abstract as attached.

Please delete Columns 1 thru Columns 16 and insert Columns 1 thru Columns 16 as attached.

Signed and Sealed this

Fifteenth Day of April, 2008

JON W. DUDAS
*Director of the United States Patent and Trademark Office*

(12) United States Patent
Hahn et al.

(10) Patent No.: US 6,982,534 B2
(45) Date of Patent: Jan. 3, 2006

(54) METHOD FOR OPERATING AN ELECTRONICALLY COMMUTATED MOTOR, AND MOTOR FOR CARRYING OUT ONE SUCH METHOD

(75) Inventors: Alexander Hahn, Sauldorf-Boll (DE); Walter Heydrich, Georgen (DE); Hermann Rappenecker, Vöhrenbach (DE)

(73) Assignee: ebm-papst St. Georgen GmbH & Co. KG, St. Georgen (DE)

( * ) Notice: Subject to any disclaimer, the term of this patent is extended or adjusted under 35 U.S.C. 154(b) by 12 days.

(21) Appl. No.: 10/487,461

(22) PCT Filed: Aug. 7, 2002

(86) PCT No.: PCT/EP02/08802

§ 371 (c)(1),
(2), (4) Date: Feb. 19, 2004

(87) PCT Pub. No.: WO03/034581

PCT Pub. Date: Apr. 24, 2003

(65) Prior Publication Data

US 2004/0251863 A1    Dec. 16, 2004

(30) Foreign Application Priority Data

Oct. 10, 2001 (DE) ............................. 101 49 935

(51) Int. Cl.
*H02K 17/32* (2006.01)
(52) U.S. Cl. ............... 318/434; 318/138; 318/254
(58) Field of Classification Search ............... 318/434, 318/254, 138, 471, 432, 433; 388/811

See application file for complete search history.

(56) References Cited

U.S. PATENT DOCUMENTS 4,814,675 A    3/1989    Perilhon .................. 318/254
4,839,754 A    6/1989    Gami et al. ............ 360/73.01

(Continued)

FOREIGN PATENT DOCUMENTS

CA    2334674    12/1999
DE    30 44 027 A1    8/1981
DE    36 07 014 A1    9/1986

(Continued)

OTHER PUBLICATIONS

Derwent WPI English abstract of DE 30 44 027-A1, Müller, pub. Aug. 1981.

*Primary Examiner*—Karen Masih
(74) *Attorney, Agent, or Firm*—Milton Oliver, Esq.; Ware Fressola Van Der Sluys & Adolphson LLP

(57) ABSTRACT

The invention concerns a method of operating an electronically commutated motor (10) that is equipped with a current limiting arrangement which acts on a Pulse Width Modulation (PWM) controller (56). The latter, in operation, delivers PWM pulses (60) having a controllable pulse duty ratio (pwm) and a substantially constant frequency. In the event a predetermined upper limit value ($I_{soll}$; $I_{w}$) of the motor current is exceeded, the current limiting arrangement effects a change in this pulse duty factor (pwm) in order to reduce the motor current ($I_{eq}$). If the motor current ($I_{ux}$) exceeds a predetermined upper limit value ($I_{soll}$; $I_{w}$) while the motor is rotating, that limit value ($I_{soll}$; $I_{w}$) is raised by a timing member (260) during a predetermined time span (304) (FIG. 8: $I_{max}$) so that the available motor power is raised in the context of a load peak. If the rotor (24) is stalled, the limit value ($I_{soll}$) is not raised but instead is greatly lowered. The limit value ($I_{soll}$) is preferably raised as a function of the rotation speed of the motor (10) in order to utilize the improved motor cooling at high rotation speeds. At start-up of the motor (10), the limit value ($I_{soll}$) is briefly increased to a high value in order to enable dependable starting.

17 Claims, 11 Drawing Sheets

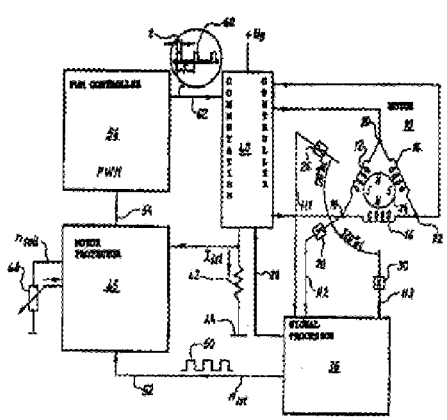

METHOD FOR OPERATING AN ELECTRONICALLY COMMUTATED MOTOR, AND MOTOR FOR CARRYING OUT ONE SUCH METHOD

This application is a §371 of International Application PCT/EP02/08802, filed Aug. 7, 2002 and published Apr. 24, 2003 as WO 03-034581. Priority is also claimed from German application DE 101 49 935.3, filed Oct. 10, 2001.

FIELD OF THE INVENTION

Electronically commutated motors are used for many driving tasks, e.g. in vacuum cleaners, equipment fans, medical devices, video recording devices, etc. Such motors are subject to many requirements, among which a low price is paramount. This means that a motor of this kind must be efficiently utilized for the particular driving task without being overloaded.

BACKGROUND

This is usually achieved by current limitation, i.e. the motor current is limited so that it cannot exceed a predetermined upper limit value. The power of such a motor is then, however, unnecessarily limited at startup, when a particularly high motor power is necessary. Many such motors could also be operated at higher power at high rotation speeds, since their cooling is then better and such a motor could absorb and deliver greater power. A motor of this kind could also, in many cases, temporarily deliver more power in the context of a load peak because it has a "thermal reserve," i.e. the motor does not immediately overheat if an overload occurs briefly. There exist special circuits for this purpose with which a motor can be "simulated" by means of an electronic or mechanical model, but such solutions are too expensive for low-cost applications.

SUMMARY OF THE INVENTION

It is therefore an object of the invention to make available a novel method for operating an electronically commutated motor, and a novel electronically commutated motor for carrying out such a method.

According to a first aspect of the invention, this object is achieved by monitoring whether a predetermined upper current limit value is exceeded and, if so, temporarily increasing the upper limit value. If a load peak occurs in such a motor so that the motor current exceeds its predetermined limit value, that limit value is increased by a timing member during a predetermined time span, provided the motor is rotating. The available power of the motor is thereby temporarily increased in the event of a load peak. Provision is preferably made, however, to prevent that increase from also occurring if the motor is stalled, since in that case the motor current should be as low as possible in order to avoid overheating and the resulting risk of fire. Preferred refinements of such a method are to temporarily increase the limit value by generating a signal which actuates a timing member, and to transfer the signal to the timing member via an AC voltage coupling.

A motor for carrying out this method can be implemented by using a current limiting circuit which acts on a Pulse Width Modulation (PWM) controller.

Another approach to achieving the stated object is use a voltage divider to specify the upper limit value, and to adjust the voltage divider by applying to it current pulses as a function of motor rotation speed. Because at least one current pulse is generated and is conveyed to the voltage divider, the current flowing to the voltage divider becomes greater for the duration of that current pulse, and the upper current limit thus rises. This allows better utilization of the motor, especially when rotation-speed-dependent current pulses - which increase the upper current limit with increasing rotation speed - are generated. The reason for this is that a motor is usually cooled better as rotation speed rises, and can therefore deliver more power. This applies in particular to external-rotor motors.

A further approach to achieving the stated object is to use a combination of a voltage divider and a capacitor connected in parallel to it. The capacitor that is connected in parallel with a splitting resistor of the voltage divider is discharged before the motor is switched on. Immediately after switching on, it therefore acts as a short circuit for that splitting resistor and thus increases the upper limit value at startup temporarily, i.e. until that capacitor has charged. It is thereby possible, in a motor of this kind, to raise the starting torque without causing a long-term overload of the motor.

Another approach to achieving the stated object is to use the output signals from rotor position sensors (e.g. Hall sensors) to generate a rotation-speed-dependent frequency signal. In such a motor, the output signals of the rotor position sensors have a relatively low frequency that is proportional to the motor rotation speed. The invention allows this frequency to be increased, specifically in such a way that beginning at a rotation speed of zero (at which the increased frequency also has a value of zero), a signal is available whose frequency is increased by a factor of three, for example, in a three-phase motor; this makes possible, for example, a more accurate indication of rotation speed, more accurate rotation speed control, more accurate sensing of the rotor rotational position, and more exact adaptation of the upper limit value of the motor current to the instantaneous rotation speed. In many cases this allows expensive encoders to be dispensed with.

The present invention can be used in particularly advantageous fashion for electronically commutated external-rotor motors.

Further details and advantageous refinements of the invention are evident from the exemplary embodiment, which is in no way to be understood as a limitation of the invention, that is described below and depicted in the drawings.

BRIEF FIGURE DESCRIPTION

FIG. 1 is an overview circuit diagram to explain the invention;

FIG. 2 shows an example of a full bridge circuit for a three-phase motor;

FIG. 3 shows a circuit for generating a signal 50 having a rotation-speed-dependent frequency whose frequency is three times as great as the frequency of the motor's Hall signals from which signal 50 is derived;

FIG. 4 is a diagram to explain the manner of operation of FIG. 3;

FIG. 5 is an overview depicting the manner in which several preferred components interact;

FIG. 6 is a circuit diagram showing further details of the arrangement according to FIG. 5;

FIG. 7 schematically depicts, using an example, the change in upper limit $I_{soll}$ for the motor current as a function of various operating parameters;

FIG. 8 shows curves that indicate, for the exemplary embodiment indicated, the rise in the upper current limit with increasing rotation speed; the lower curve Iw shows the rotation-speed-dependent rise in that upper limit, and the upper curve Iwmax shows the rotation-speed-dependent rise in the upper limit onto which is also overlaid an additional increase due to activation of an arrangement that is labeled 260 in FIGS. 5 and 6;

FIG. 9 is a diagram to explain the manner of operation of PWM generator 56 in FIGS. 5 and 6;

FIG. 10 is a diagram similar to FIG. 9 that shows events in the context of a temporary increase in the upper current limit;

FIG. 11 is a diagram showing a variant of the arrangement according to FIGS. 5 and 6; and FIG. 12 is a diagram to explain the mode of operation of FIG. 11.

DETAILED DESCRIPTION

In the description below, identical or identically functioning parts are labeled with the same reference characters and are usually described only once.

FIG. 1 is an overview circuit diagram comprising an electronically commutated motor (ECM) 10, here (as an example) a motor having three phases 12, 14, 16 in delta configuration with terminals 18, 20, 22 and a permanent-magnet rotor 24. The latter is depicted, for example, as having four poles. It controls three Hall generators 26, 28, 30 that have angular spacings of 120 degrees el. and generate, during operation, signals H1, H2, H3 that, as shown in FIGS. 4A through 4C, are each phase-shifted 120 degrees from one another. These signals serve for rotation speed measurement and to control the currents through phases 12, 14, 16. ECM 10 is preferably an external-rotor motor.

Signals H1, H2, H3 are conveyed to a signal processor 36, which is depicted in FIG. 3 and whose output signals are conveyed through a schematically depicted connection 38 to an output stage 40 that is depicted in FIG. 2 and contains a control logic unit for controlling the currents in phases 12, 14, 16. Terminals 18, 20, 22 are connected to output stage 40. The latter is connected to an operating voltage $+U_B$, e.g. to +24 V, +48 V, +60 V or the like, and is connected via a current measuring resistor 42 to ground 44. All the current of motor 10, which is labeled $I_{ist}$ (actual current value), flows through resistor 42.

A voltage drop occurs during operation at resistor 42, and is conveyed to an apparatus 46 which limits current $I_{ist}$ and serves as a dynamic motor protector. A rated speed $n_{soll}$ for motor 10 can be set at this apparatus using a potentiometer 48.

Apparatus 46 has conveyed to it via lead 52 a signal 50 that has three times the frequency of signals H1, H2, H3 and is created in signal processor 36.

An output signal from apparatus 46 is conveyed through a signal connection 54 to a PWM controller 56 which, as a function of the signal at connection 54, supplies a PWM signal 60. The latter has a frequency f of, for example, 25 kHz, corresponding to a period T=0.04 ms. This signal 60 has a pulse duty factor $$pwm = t/T \quad (1)$$

that is between 0 and 100% depending on the magnitude of the signal at input 54. Signal 60 is conveyed through a connection 62 to output stage 40.

Apparatus 46 preferably has the basic function, usual in such motors, of regulating the rotation speed to a desired value, e.g. to 10,000 rpm, and also limiting motor current $I_{ist}$ to a predetermined value that, as shown in FIG. 8, is e.g. approximately 4.2 A at 10,000 rpm.

At start-up, apparatus 46 is intended to limit the current briefly (e.g. for 0.5 s) to a higher value, for example to 7 A according to FIG. 7 or 12.

If greater loads occur briefly, apparatus 46 is intended to absorb those load increases by permitting a higher current of 5.5 A, for example, for one second, including at start-up; segments having a "normal" current of 3.5 A and lasting for example, 4 s are always intended to be present between these higher currents (5.5 A).

Lastly, when motor 10 is stalled (i.e. at a rotation speed of zero) the current is to be decreased to a low value, e.g. to 1.3 A, so that motor 10 does not overheat when at a standstill.

Furthermore, as shown in FIG. 8, in the case of an external-rotor motor 10 the permissible current $I_{soll}$ ($I_w$ in FIG. 8) is intended to rise with rotation speed n, since an external-rotor motor in particular is cooled better with increasing rotation speed and therefore "tolerates" a higher current when running at high speed.

These functions naturally do not all need to be implemented in a specific motor 10 and can instead also be used only in part, and the numbers indicated are merely examples to facilitate comprehension.

FIG. 2 shows the essential elements of power section 40. The latter contains a full bridge circuit comprising three upper transistors 70, 72, 74 that are implemented as p-channel MOSFETs, and three lower transistors 76, 78, 80 that are implemented as n-channel MOSFETs. A recovery diode 70', 72', 74', 76', 78', 80' is connected antiparallel with each of these transistors.

In upper transistors 70, 72, 74, source S is connected via a lead 82 to +UB. In lower transistors 76, 78, 80, source S is connected to a bus 84 that is connected via measuring resistor 42 to ground 44, so that all of the motor current flows through resistor 42.

Drain terminals D of transistors 70 and 76 are connected to winding terminal 18 of motor 10, D terminals of transistors 72 and 78 to winding terminal 20, and D terminals of transistors 74 and 80 to terminal 22. When transistor 70 and transistor 78, for example, are conductive, a current flows from left to right through phase 12, and a smaller current flows through the series circuit of phases 16 and 14. The magnitude of these currents depends substantially on the voltages that are induced in these phases by the rotating rotor 24 (FIG. 1).

The individual transistors 70 through 80 are switched on via AND elements. According to FIG. 4, for example, between 0 degrees el. and 60 degrees el.:

H1=1, H2=1, H3=0, or in abbreviated fashion HS=110.

In this case transistors 72 through 80 are controlled as follows:

Transistors 70, 74, 76, 78=0.

Transistors 72, 80=1.

This is done by way of the AND elements depicted in FIG. 2. With the combination H1=1 and H3=0, transistor 80 is switched on; with the combination H2=1 and H3=0, transistor 72 is switched on. The other transistors remain blocked. Similarly, between 60 degrees el. and 120 degrees el., HS=101.

In this case, transistors 70 and 78 are switched on and the remaining transistors 72, 74, 76, and 80 are blocked.

The switching state of full bridge circuit 70 through 80 is thereby advanced after each 60 degrees el. so that winding phases 12, 14, 16 generate a rotating electromagnetic field in known fashion, as is common practice for such motors.

For this purpose, in transistor 70 gate G is connected via a resistor 88 to lead 82 and via a resistor 90 to the collector of an npn transistor 92 whose emitter is connected to ground and whose base is connected via a resistor 94 to the output of an AND element 96 that delivers a positive signal at its output (and thereby makes transistors 92 and 70 conductive) when a signal H1=1 is present at input 98 of AND element 96, and a signal H2/=1 (corresponding to H2=0) is present at input 100.

In the same fashion, transistor 72 is made conductive by an AND element 102 when the values H2=1 and H3=0 are present at that element 102.

Transistor 74 is made conductive by an AND element 104 when signals H3=1 and H1=0 are present at that element.

Lower transistor 76 is made conductive, by an AND element 106 having three inputs, when H2=1, H1=0, and (at lead 62) PWM signal 60=1, i.e. PWM signal 60 switches on and off that particular lower transistor 76, 78, 80 that is presently being made conductive by the combination of signals H1, H2, H3.

An AND element 108 that is activated by H2=0, H3=1, and PWM signal 60=1 serves to control transistor 78; and an AND element 110 that is activated by H3=0, H1=1, and PWM signal 60=1 serves to control transistor 80.

The commutation system shown in FIG. 2 is merely an example for better comprehension of the invention.

FIG. 3 shows circuit 36 for creating signal 50 having three times the frequency of signals H1, H2, H3. A particular advantage of this circuit is that it is effective down to a rotation speed of zero, and that the frequency tripling permits a better measurement of the rotation speed of motor 10 and optimum adaptation of the current limitation operation to the instantaneous rotation speed of that motor.

As FIG. 3 shows, the current inputs of the three Hall generators 26, 28, 30 are connected in series. The upper current input of Hall generator 26 is connected via a resistor 120 to a lead 122 (e.g. +5 V), and the lower current terminal of lower Hall generator 30 is connected via a resistor 124 to ground 44. Resistors 120, 124 are preferably approximately the same size.

Associated with Hall generator 26 is a comparator 126 to whose two inputs 128 (+) and 130 (−) are connected the two outputs of Hall generator 26. Output 132 of comparator 126 is connected via a pull-up resistor 134 to positive lead 122, via a resistor 136 to input 128, and via a resistor 138 to negative input 140 of a comparator 142.

As FIG. 3 shows, Hall generator 28 has a comparator 126' and Hall generator 30 has a comparator 126". The circuit is the same in each case, and therefore the same reference characters are used (i.e. for example 128, 128', and 128") and these parts will not be described again.

Positive input 144 of comparator 142 is connected via a resistor 146 to lead 122 and via a resistor 148 to ground 44.

Output 150 of comparator 142 is connected to input 140 via a resistor 152 which effects a switching hysteresis; to lead 122 via a resistor 154; and to ground 44 via a resistor 156, a node 158, and a resistor 160.

Connected to node 158 is the base of an npn transistor 162 whose emitter is connected to ground 44 and whose collector is connected to an output 164 at which a pulse train, having a frequency that is proportional to the instantaneous rotation speed $n_{ist}$ of motor 10, can be picked off.

Preferred Values for FIG. 3

| Comparators 126, 126', 126", 142 | 4 × LM 2901 |
| Resistors 120, 124 | 200 ohm |
| Resistors 136, 136', 136" | 220 k |
| Resistors 134, 134', 134", 154 | 3.3 k |
| Resistors 138, 138', 138", 146, 148, 156 | 33 k |
| Resistor 152 | 1 M |
| Resistor 160 | 10 k | k = kOhm; M = megohm

Mode of Operation of FIG. 3

The two resistors 146, 148, which are the same size, set input 144 of comparator 142 to approximately +2.5 V.

In the range 0 to 60 degrees el., FIG. 4 shows that H1=1, H2=1, H3=0. The output of comparator 126" is consequently connected to ground and the outputs of comparators 126, 126' are not connected to ground, so that a current flows from lead 122 through resistors 134, 138, and 134', 138' to node 140 and from there through resistor 138" to ground 44. As shown in FIG. 4D, this results in a potential at node 140 equal to approximately two-thirds of voltage U=5 V, and comparator 142 receives at its output 150 a high signal that is labeled 1 in FIG. 4E.

In the range 60 to 120 degrees el., FIG. 4 shows that H1=1, H2=0, H3=0, i.e. the outputs of comparators 126', 126" are connected to ground and the output of comparator 126 is high-resistance. A current then flows from lead 122 through resistors 134, 138 to node 140, and from there through resistor 138' to ground, likewise through resistor 138" to ground. As shown in FIG. 4D, this results in a potential at node 140 equal to approximately one-third of voltage U=5 V, and comparator 142 consequently receives at its output 150 a low signal that is labeled 0 in FIG. 4E.

In this fashion, after each 60 degrees el. the potential at output 150 jumps either from 0 to 1 or from 1 to 0, and signal 50 whose frequency is three times the frequency of signals H1, etc. is obtained there. That signal is also available at output 164, e.g. for monitoring the rotation speed of motor 10. Such monitoring is requested by many customers.

FIG. 5 is an overview to explain the basic aspects of the invention. The voltage at measuring resistor 42 is conveyed through a resistor 207 and a smoothing capacitor 208 to negative input 210 of a comparator 204 whose output is labeled 216. Positive input 212 of comparator 204 is connected to a node 214 whose potential determines the upper limit of the current in motor 10, i.e. its available power. If that upper limit is exceeded, the pulse duty factor of pulses 60, which are generated by a PWM generator 56, is automatically reduced.

Node 214 is connected via a resistor 240 to ground 44, via a resistor 238 to a node 232, and via a resistor 300 to switch 286 of a timing member 260 that is connected via a capacitor 262 to output 216 of comparator 204.

Node 232 is connected to lead 122 via a resistor 234 and a capacitor 236 parallel to the latter. It is also connected via a resistor 230 to the collector of a pnp transistor 226 whose emitter is connected to lead 122 and to whose base a rotation-speed-dependent signal f(n) is conveyed.

Output 216 is connected via a resistor 202 (having a value R2) to the input of PWM generator 56, to which a rotation-speed-determining signal ("n signal") is also conveyed, usually from a rotation speed controller or a manual rotation speed adjuster, via a resistor 196 having a value R1. Resistance value R1 is substantially greater than R2. Typical values yielding a preferred ratio of R1 to R2 will be indicated below.

PWM generator 56 supplies, at an output 190, PWM signal 60 that is conveyed through lead 62 (see FIGS. 1 and 2) to commutation controller 40.

Mode of Operation of FIG. 5

As long as potential $u_{210}$ at input 210 of comparator 204 is lower than potential $u_{212}$ at its input 212, output 216 of comparator 204 is high-resistance and has no influence on modules 56 and 260 connected to it. This is the case as long as motor current $I_{tot}$ is lower than an upper limit value that is defined by potential $u_{212}$ of node 214.

That potential is in turn determined by the ratio among resistors 234, 238, 240 and by a rotation-speed-dependent current 248 that flows through transistor 226 and resistor 230 to node 232, the potential at node 232 being smoothed by capacitor 236. Potential $u_{212}$ at node 214, and consequently also the upper limit of current $I_{tot}$, thus rises with increasing rotation speed.

If current $I_{tot}$ becomes too high, comparator 204 flips and its output 216 is connected to ground 44. The potential change thereby occurring at output 216 is transferred through capacitor 262 to timing member 260 and switches on switch 286, for example for one second, so that resistor 300 is connected in parallel with resistors 234, 238 and potential $u_{212}$ of node 214 is raised for that one second so that output 216 of comparator 204 immediately becomes high-resistance again and current $I_{tot}$ can once again rise. After that one second has elapsed, switch 286 opens and potential $u_{212}$ at node 214 drops back, causing current $I_{tot}$ once again to be limited to a lower value. If output 216 is connected to ground in this context, a current flows from input 194 through resistor 202 and comparator 204 to ground 44, thereby abruptly reducing the potential of input 194. Pulse duty factor pwm (equation 1) of PWM signal 60 is thereby also immediately reduced in order to reduce motor current $I_{tot}$, and keep it below the desired upper limit. The frequency of signal 60 remains unchanged in this context, which is an important advantage.

To ensure that the increase in the potential at node 232 and thus also at node 214 is as great as possible, resistor 234 is preferably selected to be substantially larger than the sum of resistors 238 and 240. The voltage drop at current measuring resistor 42 is kept as low as possible. Potential value $u_{212}$ at node 214 for upper current limit $I_{soll}$ is thus also low, and because resistor 300 is connected in parallel it is easily possible to double upper current limit $I_{soll}$ if so desired.

At start-up, capacitor 236 is discharged and acts then as a short-circuit for resistor 234, so that at startup, potential $u_{212}$ of node 214 is raised until capacitor 236 has charged. The starting current of motor 10 can thereby be greatly increased for a short time in order to ensure reliable starting, as shown in FIG. 7 at 252. A longer-duration increase is possible with the variant shown in FIGS. 11 and 12.

One important aspect of the present invention is therefore voltage divider 234, 238, 240, to which, as a function of motor parameters, signals of various kinds are conveyed from outside in order to limit or optimally utilize the available power of motor 10. The various external influences on this voltage divider that are described represent, of course, only examples of the many possibilities offered by this principle.

FIG. 6 shows details of a preferred embodiment of FIG. 5. The same reference characters as in FIG. 5 are used for parts identical, or identical in function, to parts in that Figure. PWM generator 56 contains a triangular signal generator having a comparator 170 whose positive input 172 is connected via a resistor 174 to lead 122 (+5 V), via a resistor 176 to output 178, and via a resistor 180 to ground 44. Output 178 is connected via a resistor 181 to lead 122 and via a resistor 182 to negative input 184, which is also connected to the negative input of a comparator 186 and, via a capacitor 188, to ground 44. PWM signal 60 is generated at output 190 of comparator 186. Output 190 is connected via a pull-up resistor 192 to lead 122.

Comparator 170 with its various circuit elements generates a triangular voltage $u_{184}$ (see FIG. 9) at, for example, 25 kHz at input 184, and that voltage is conveyed to comparator 186.

The output signal, for example, of a rotation speed controller 200 (indicated only schematically) is conveyed, as potential $u_{194}$, to positive input 194 via resistor 196, and input 194 is connected via resistor 202 to the output of comparator 204, which is a constituent of an arrangement for current limiting.

The voltage at measuring resistor 42, determined by motor current $I_{tot}$, is conveyed through resistor 207 and filter capacitor 208 to negative input 210 of comparator 204, as already described with reference to FIG. 5. The latter's positive input 212 is connected to node 214, and potential $u_{212}$ there determines current $I_{soll}$ at which the current limiting arrangement is activated: the current is limited to a high value if the potential at node 214 is high, and to a low value if it is low.

Specifically, if current $I_{tot}$ becomes sufficiently high that potential $u_{210}$ of input 210 becomes higher than potential $u_{212}$ of input 212, comparator 204 flips and its output 216 goes to ground potential, so that a current flows from input 194 through resistor 202 to ground; as a result, potential $u_{194}$ at input 194 of comparator 186 abruptly decreases, pulse duty factor pwm of pulses 60 consequently becomes lower, and current $I_{sp}$ is thus reduced because transistors 76, 78, 80 are switched on and off at that pulse duty factor, as described with reference to FIG. 2.

FIG. 9 shows triangular voltage $u_{184}$ that is furnished by comparator 170 which serves as the triangular signal generator. This triangular voltage is compared in comparator 186 with potential $u_{194}$ at input 194 of that comparator.

If motor current $I_{tot}$ at time $t_{10}$ is higher than the predetermined value $I_{soll}$, comparator 204 flips, its output 216 becomes LOW, and a current flows through resistor 202 to ground 44 so that potential $u_{194}$ makes a downward jump 195 at time $t_{10}$.

The result, as depicted in FIG. 9B, is that as of time $t_{10}$ the pulses of PWM signal 60 become shorter, and motor current $I_{tot}$ consequently decreases until it is once again lower than $I_{soll}$. When that situation exists, comparator 204 flips back into its other state in which its output 216 is high-resistance, and no further current flows through resistor 202.

A negative potential change at output 216 causes a transistor 264 to switch on and results in a temporary raising of upper current limit $I_{soll}$ as depicted in FIG. 7 at 304, and in this situation the length of pulses 60 temporarily increases again.

Controlling pulses 60 exclusively by way of pulse duty factor pwm, using a fixed frequency for PWM signal 60, is very advantageous because, for example, it is possible always to work at 20 kHz or higher. That frequency lies beyond the range of human hearing, and motor 10 thus becomes quieter.

An arrangement 220 serves to increase the potential at node 214 (see FIG. 8) in rotation-speed-dependent fashion.

Pulses 50 (at tripled frequency) are conveyed through the series circuit of a capacitor 222 and a resistor 224 to the base of a pnp transistor 226 that is connected via a resistor 228 to lead 122, to which the emitter of transistor 226 is also connected. The collector of this transistor 226 is connected via a resistor 230 to a node 232, which is connected to lead 122 (+5 V) via a resistor 234 and a capacitor 236 parallel thereto. Node 232 is likewise connected via a resistor 238 to node 214, and the latter is connected via a resistor 240 to ground 44.

Resistors 234 (430 k), 238 (100 k) and 240 (8.2 k) constitute a voltage divider, and in the steady state, when no external influences are acting on the voltage divider, the potential of ground 44 is 0 V, node 214 0.076 V, node 232 1 V, and lead 122 +5 V.

Potential $u_{212}$ at node 214 determines the upper current limit to which motor current $I_{ist}$ is limited—for example, according to FIG. 8, to approx. 4.2 A at 10,000 rpm in continuous operation. This potential $u_{212}$ is conveyed to positive terminal 212 of comparator 204; when it is low, comparator 204 already switches over at a low current $I_{ist}$ and reduces potential $u_{194}$ at input 194 of comparator 186, thereby already reducing pulse duty factor pwm (equation 1) of pulses 60 at a low motor current $I_{ist}$.

Raising the Current Limit as a Function of Rotation Speed

Arrangement 220 (FIG. 6) causes a current pulse 248 of constant pulse width to be generated at each pulse 50 (FIG. 4E). A particularly advantageous approach to achieving the constant pulse duration of current pulses 248 is to connect the base of transistor 226 to capacitor 222, resistor 224, and resistor 228. The pulse duration is determined by the product of the capacitance of capacitor 222 and the sum of the values of resistors 224 and 228, i.e. C222*(R224+R228). Current pulses 248 are conveyed to node 232, so that an additional current 248 flows through resistors 238, 240 and raises the potential of node 214. This additional current 248 does not flow, however, when motor 10 is stalled, resulting in a low motor current when the motor is stalled.

Since more pulses 50 and 248 are generated per unit time as the rotation speed increases, this additional current through resistors 238, 240 rises with increasing rotation speed so that the upper current limit rises with increasing rotation speed.

To ensure that the potential at node 232 and therefore also at node 214 is raised as much as possible, resistor 234 is preferably selected to be very much larger than the sum of resistors 238 and 240.

Dynamic Current Raising in Response to Load Surges

An ECM 10 is designed so that it has a power reserve, i.e. its temperature is almost unaffected if increased power is demanded of it for only a brief time. If that same increased power were required from motor 10 on a continuous basis, however, it would overheat and be destroyed as a result.

It is thus very preferable to use dynamic current raising for load surges. This is accomplished with part 260 in FIG. 6, whose function has already been explained with reference to FIG. 5.

Output 216 of comparator 204 is connected via a capacitor 262 to the base of a pnp transistor 264 that in turn is connected via a resistor 266 to lead 122. The collector of transistor 264 is connected to ground 44. Its emitter is connected via a resistor 268 to lead 122, via a resistor 270 to a node 272, and directly to negative input 274 of a comparator 276. Node 272 is connected via a resistor 278 to positive input 280 of comparator 276, and via a resistor 282 to ground 44.

Output 284 of comparator 276 is connected to the base of an npn transistor 286, also via a resistor 288 to lead 122 and via a capacitor 290 to a node 292, which in turn is connected to positive input 280 via a resistor 294 and to ground 44 via the series circuit of a resistor 296 and a diode 298.

The collector of transistor 286 is connected to lead 122, and its emitter via resistor 300 to node 214.

When transistor 286 is conductive, resistor 300 (180 k) is connected in parallel with the series circuit of resistors 234 and 238; the result is that potential $u_{212}$ at node 214 jumps to a higher value, and the upper current limit is raised as shown in FIG. 7, e.g. from 3.5 to 5.5 A.

If motor current $I_{ist}$ is too high, comparator 204 flips to LOW; this potential change is transferred through capacitor 262 to the base of pnp transistor 264 and makes it conductive, so that it bypasses resistors 270, 282 and switches over comparator 276, which is connected as a monoflop. Transistor 264 suppresses the positive pulses that are produced upon differentiation by capacitor 262, so that only the negative pulses can cause comparator 276 to switch over.

Output 284 of comparator 276 is LOW in the idle state. When the monoflop is triggered, output 284 becomes HIGH for a period defined by components 290, 296, 298 and then flips back to LOW.

As long as output 284 is high, transistor 286 is switched on and an additional current flows through it and resistor 300 to node 214, as already described. Transistor 286 acts in this context as an ideal switch, i.e. resistor 300 is decoupled from node 214 when transistor 286 is blocked.

The time during which output 284 is high is here approximately 1 second, and it is followed in each case by a period of at least 4 seconds during which output 284 is LOW; this results, as shown by FIG. 7, in short segments 304 of higher current separated from one another by long segments 306 of lower current. This prevents overloading of motor 10, but allows adaptation to short-duration load surges that can occur in many drive systems.

When rotor 24 of motor 10 is stalled, the current limiting arrangement is continuously active, i.e. comparator 204 is continuously flipped, so that no pulses are transferred through capacitor 262 and circuit 260 is not activated.

No further pulses 50 are generated when rotor 24 is stalled, meaning also that no further current pulses 248 are generated. The current then drops as indicated by segment 308 of FIG. 7, and at a standstill is limited to a low value 310 in order to prevent overheating of ECM 10 when it is stalled.

FIG. 10 schematically depicts, for FIGS. 5 and 6, motor current $I_{ist}$ represented by potential $u_{210}$ at input 210 of comparator 204, upper current limit $I_{soll}$ represented by potential $u_{212}$ at input 212 of comparator 204, and potential $u_{216}$ at output 216 of comparator 204 in the event that upper current limit $I_{soll}$ is exceeded.

Upper current limit $I_{soll}$ is exceeded at time $t_{20}$. As a result, comparator 204 switches to LOW and monoflop circuit 260 is activated (see description of FIG. 5) so that upper current limit $I_{soll}$ is raised for the period $T_1$ (e.g. 1 second) determined by monoflop circuit 260. Potential $u_{216}$ thus becomes high again at time $t_{21}$.

At time $t_{22}$ motor current $I_{ist}$ has returned to its normal level, for example because the brief additional load or interference is no longer present. Monoflop circuit 260 is deactivated after time period $T_1$, and upper current limit $I_{soll}$ returns to its original value. No further current excursions occur until time $t_{24}$.

At time $t_{24}$ upper current limit $I_{soll}$ is once again exceeded, and output 214 is switched to LOW. Since monoflop circuit 260, after completion of the upper current limit raising, does not permit a further raising for a period $T_2$ of, for example, 4 seconds (in order to protect the motor from overheating), the current excursion has no effect until time $t_{26}$. Motor current $I_{st}$ cannot rise further. Between $t_{24}$ and $t_{26}$, as depicted, potential $u_{216}$ oscillates continuously between HIGH and LOW because here the current limiting function acts based on the present value of $I_{soll}$.

At time $t_{26}$ motor current $I_{ist}$ drops back, in this example, below upper current limit $I_{soll}$ and output 216 goes back to HIGH.

At time $t_{28}$ upper current limit $I_{soll}$ is once again exceeded. Because time period $T_2$ has not yet elapsed, the upper current limit is not raised. That does not occur again until time $t_{30}$, at which time period $T_2$ has elapsed. Starting at $t_{30}$, upper current limit $I_{soll}$ is once again raised for time period $T_1$. Motor current $I_{ist}$ can thus briefly rise back to a higher value, as depicted at A.

At time $t_{32}$ motor current $I_{ist}$ drops back into the normal range, and potential $u_{216}$ therefore becomes continuously high again. Time span $T_1$ ends at time $t_{34}$, and the upper current limit is lowered back to the normal value.

The mode of operation of the arrangement of FIGS. 5 and 6 is based partly on the fact that potential $u_{212}$ at node 214, which defines the upper current limit, is modified as a function of certain operating conditions so that it becomes either higher or lower; consequently the motor current is automatically limited, as a function of operating parameters of the motor, to various values in order to optimize utilization of the output capabilities of ECM 10.

FIG. 8 shows, as an example, the raising of the upper current limit in a motor that is designed for a rotation speed of approximately 10,000 rpm.

If the motor is stalled (rotation speed n=0), the motor current is limited to a value of approximately 1.4 A. Upper current limit Iw=f(n) rises to approximately 4.2 A at 10,000 rpm. The curve becomes flatter in the upper region and reaches a plateau; this flat region is placed, by the selection of electrical components 222, 224, 228, 230, in the vicinity of the motor's rated speed.

FIG. 8 also shows a curve Iwmax corresponding to the raised upper current limit resulting from the activation of monoflop 260. This causes the upper current limit at 10,000 rpm to be increased, for example, from approximately 4.2 to approximately 4.8 A; there is a corresponding increase in torque M, which is shown in FIG. 8 on the left-hand scale and is proportional to the actual motor current. Since an external-rotor motor is effectively cooled at 10,000 rpm by the air turbulence that is generated, it can dissipate substantially more waste heat at that rotation speed than at a standstill, and the permissible motor current can therefore be substantially higher at 10,000 rpm than when the motor is stalled. This makes it possible to achieve higher rotation speeds, and thus greater power, with a motor of predetermined size.

It is also possible in the context of the invention to temporarily switch off the motor current completely when the motor is stalled, and to attempt a restart at regular time intervals.

Capacitor 236 at node 232 effects a smoothing of the potential at that node, resulting in a stable target value at comparator 204.

Arrangement 220 is thus particularly advantageous for external-rotor motors, but can of course be used in all motors in which cooling improves with increasing rotation speed.

Current Raising at Start-Up

Capacitor 236 (1.5 µF) has the additional function of being discharged at start-up and functioning briefly at that time as a short circuit for resistor 234. The potential at node 232 is thereby briefly raised to +5 V, and the potential at node 214 rises to 0.38 V so that current $I_{st}$ is limited to a high value. This is shown in FIG. 7 at 252, where after start-up the current limit drops within 0.5 second from 7 A to 5.5 A, so that motor 10 can start at a very high torque that is nevertheless quickly reduced.

The duration $t_{START}$ of the starting pulse is defined approximately as:

$$t_{START} = C_{236} * R_{234} * (R_{238} + R_{240})/(R_{234} + R_{238} + R_{240}) \quad (2)$$

Preferred Values of Components in FIG. 6

| Component | Value |
|---|---|
| Capacitor 222 | 3.3 nF |
| Resistors 224, 228 | 51 k |
| Transistors 226, 264 | BC857 |
| Transistor 286 | BC847 |
| Comparators 170, 186, 204, 276 | 4 × LM2901 |
| Resistor 230 | 11 k |
| Resistor 234 | 430 k |
| Resistors 180, 238 | 100 k |
| Resistor 240 | 8.2 k |
| Resistor 42 | 0.082 ohm |
| Resistor 206 | 1 k |
| Capacitor 208 | 1 nF |
| Resistor 196 | 33 k |
| Resistors 181, 192, 202, 288 | 10 k |
| Capacitor 188 | 220 pF |
| Resistor 182 | 75 k |
| Resistor 176 | 33 k |
| Resistor 174 | 62 k |
| Capacitor 262 | 33 nF |
| Resistor 266 | 22 k |
| Resistor 268 | 45 k |
| Resistor 270 | 3 k |
| Resistor 282 | 2 k |
| Resistors 278, 294 | 1 M |
| Capacitor 290 | 1 µF |
| Resistor 296 | 620 k |
| Diode 298 | 1N4148 |
| Capacitor 236 | 1.5 µF |
| Resistor 300 | 180 k |

Voltage at lead 122 = +5 V, regulated.
Rated speed of motor = 10,000 rpm.
k = kilohm, M = megohm.

FIG. 11 shows a preferred variant of the manner in which the rotation-speed-dependent signal 50 (FIG. 4E) created by circuit 36 (FIG. 3) at its output 150 is conveyed to node 232 for a circuit according to FIG. 5 or FIG. 6. This variant differs from FIG. 6 by having the two components 231, 233. The remaining components are largely identical to FIG. 6 and are therefore not described again. In FIG. 11, the base of pnp transistor 226 is connected to ground 44 via the series circuit of a resistor 231 and a capacitor 233.

At start-up, the previously discharged capacitor 233 is charged through resistors 228 and 231. The voltage drop at resistor 228 during this charging operation makes transistor 226 conductive temporarily, thereby connecting resistor 230 in parallel with resistor 234 so that the potential at node 232 is greatly raised during this period. The duration $T_{start233}$ of this raising is determined approximately by $$T_{start233} \approx (R_{228} + R_{231}) * C_{233} \quad (3).$$

Pulses 248 (FIG. 6) at a rotation-speed-dependent frequency are then conveyed through resistor 230 to node 232 in order to raise the upper current limit with increasing rotation speed, as described with reference to FIGS. 5 and 6 and depicted in FIG. 8. During $T_{start233}$, the value $I_{soll}$ (which is defined by the potential at node 214) exhibits an elevation in the form of a plateau 239 (FIG. 12) which is overlaid on the elevation due to capacitor 236 and allows a longer start-up raising of upper current limit $I_{soll}$ to be achieved. Greater inert masses can thus be accelerated, and the raised current allows a high dynamic starting torque. At the same time, the motor is protected in the event of stalling, since in such a case transistor 226 is blocked and motor current $I_{ist}$ is limited to a low value (see FIG. 7).

Preferred Values of Components in FIG. 11

| | |
|---|---|
| Capacitor 222 | 1 nF |
| Resistor 224 | 200 k |
| Transistor 226 | BC857 |
| Capacitor 233 | 1.5 µF |
| Resistors 228, 231, 234 | 430 k |

Operating voltage +5 V; k = 0 kilohm.

The invention thus concerns a method for operating an ECM 10 that is equipped with a current limiting arrangement. The latter acts on a PWM controller that, during operation, delivers PWM pulses having a controllable pulse duty factor pwm and a substantially constant frequency. If a predetermined upper limit $I_{soll}$ for the motor current is exceeded, the current limiting arrangement causes a modification of pulse duty factor pwm for pulses 60 delivered by PWM controller 56 in order to reduce the motor current. If the motor current exceeds a predetermined upper limit value $I_{soll}$ while the ECM is rotating, that limit value is raised for a predetermined time period 304 (FIG. 7), and as a result the maximum available motor power is temporarily raised— usually for a few seconds—in the event of a load peak. If rotor 24 is stalled, the limit value is not raised but is instead lowered further. Upper limit value $I_w$ is preferably also raised to a plateau as a function of rotation speed n of the motor, as depicted in FIG. 8. The aforesaid features can be applied individually or in any combination.

The invention makes it possible, in very simple fashion, to utilize the power of an ECM 10 in better fashion than before, without requiring a special (thermal) simulation of the motor for that purpose. The definition of upper current limit $I_{soll}$ ($I_w$ in FIG. 8) in the motor's rotation speed range is variable within wide limits. Many other variants and modifications are of course also possible in the context of the present invention.

What is claimed is:

1. A method for operating an electronically commutated DC motor that is equipped with
   a current limiting arrangement which acts on
   a PWM controller that, in operation, delivers PWM pulses (60) having a controllable pulse duty ratio (pwm) and a substantially constant frequency, which current limiting arrangement, in the event a predetermined upper limit value ($I_{soll}$) of the motor current is exceeded, effects a change in the pulse duty factor, of the pulses (60) delivered by that PWM controller in order to reduce the motor current,
   comprising the steps of:
   monitoring whether the motor current ($I_{ist}$) exceeds the predetermined upper limit value ($I_{soll}$) of the current limiting arrangement;
   if the motor current ($I_{ist}$) exceeds the predetermined upper limit value ($I_{soll}$) while the motor (10) is rotating, raising that limit value during a predetermined time span ($T_1$) in order to make more motor power available during that time span.

2. The method according to claim 1,
   wherein said limit value raising by the current limiting arrangement comprises
   generating a signal and transferring said signal to a timing member which, upon its activation by that signal, raises the upper limit value ($I_{soll}$) of the motor current during a predetermined time span in order, in the context of temporary load peaks, to make more power available from the motor (10) by raising the upper limit value ($I_{soll}$).

3. The method according to claim 2, wherein the step of transferring the signal generated upon response of the current limiting arrangement comprises
   transferring the signal to the timing member via an AC voltage coupling.

4. A method of operating an electronically commutated DC motor that is equipped with a current limiting arrangement which acts on a PWM controller that, in operation, delivers PWM pulses (60) having a controllable pulse duty ratio and a substantially constant frequency, which current limiting arrangement, in the event a predetermined upper limit value of the motor current is exceeded, effects a change in the pulse duty factor, of the pulses (60) delivered by that PWM controller, in order to reduce the motor current ($I_{ist}$),
   comprising the steps of:
   specifying the upper limit value by applying a potential at an output of a voltage divider,
   generating at least one current pulse as a function of rotation speed of the motor; and
   applying the at least one current pulse to an input of the voltage divider in order to raise the upper limit value ($I_{soll}$) of the motor current as rotation speed increases.

5. The method according to claim 4, wherein, in proportion to the rotation speed of the motor (10), current pulses (50) are generated that exhibit a substantially constant product of duration and amplitude.

6. The method according to claim 4,
   wherein at start-up, a further current pulse is generated and is fed to the voltage divider in order to raise the upper limit value of the motor current during the duration of that current pulse.

7. A method of operating an electronically commutated DC motor that is equipped with
   a current limiting arrangement which acts on
   a PWM controller that, in operation, delivers PWM pulses (60) having a controllable pulse duty ratio and a substantially constant frequency, which current limiting arrangement, in the event a predetermined upper limit value of the motor current ($I_{ist}$) is exceeded, effects a change in the pulse duty factor, of the pulses (60) delivered by that PWM controller, in order to reduce the motor current ($I_{ist}$),
   a voltage divider including a splitting resistor, and
   a capacitor (236) arranged in parallel with said splitting resistor, comprising the steps of:
   specifying the upper limit value ($I_{soll}$) by applying a potential at an output of the voltage divider,
   placing said capacitor in a discharged state, prior to starting of the motor, and charging said capacitor after starting of the motor (10), said capacitor in its discharged state serving as a short circuit for said splitting resistor (234) and thereby tending to increase said upper limit value, said capacitor, when charged, serving to decrease said upper limit value.

8. The motor according to claim 7, wherein the motor is a brushless electronically commutated external-rotor motor.

9. An electronically commutated motor (10) comprising
a rotor (24);
a stator having (2n+1) winding phases (12, 14, 16) and (2n+1) rotor position sensors (26, 28, 30) for furnishing output signals that, collectively, define a signal combination indicating the instantaneous position of the rotor (24), where n=1, 2, 3, ... ;
each rotor position sensor (26, 28, 30) having an output generating a sensor output signal, each sensor having associated with it, for processing of said sensor output signal, a respective comparator (126, 126', 126") having an output (132) furnishing a comparator output signal, which output signal assumes a predetermined first potential when a specific value of said sensor output signal is applied to an input of said comparator; and
wherein the output of each comparator (126, 126', 126") is connected via a first resistor (134, 134', 134") to a second potential (122) different from the first predetermined potential, and is connected via a second resistor (130, 130', 138") to an input (140) of a further comparator (142) which is configured to compare a signal ($u_{140}$) at that input (140) with a signal (U/2) of substantially predetermined magnitude and thereby to furnish, at an output (150) of said further comparator, a signal (50) whose frequency is raised in comparison with a frequency of each rotor position output signal generated while the motor (10) is running.

10. The motor according to claim 9,
further comprising means for processing said raised frequency signal (50) at the output of the further comparator (142) as a rotation-speed-dependent signal.

11. The motor according to claim 9, wherein the motor is a brushless electronically commutated external-rotor motor.

12. The motor according to claim 10, wherein the motor is a brushless electronically commutated external-rotor motor.

13. An electronically commutated DC motor comprising
a current limiting arrangement which acts on
a PWM controller that, in operation, delivers PWM pulses (60) having a controllable pulse duty ratio (pwm) and a substantially constant frequency, which current limiting arrangement, in the event a predetermined upper limit value ($I_{roll}$) of the motor current is exceeded, effects a change in the pulse duty factor (pwm), of the pulses (60) delivered by that PWM controller, in order to reduce the motor current, and
means for monitoring whether the motor current ($I_{ist}$) exceeds the predetermined upper limit value ($I_{roll}$) of the current limiting arrangement and, if so, for raising the predetermined upper limit value for a predetermined time span ($T_1$), in order to make more motor power available during that time span.

14. The motor according to claim 13, wherein the motor is a brushless electronically commutated external-rotor motor.

15. An electronically commutated DC motor, comprising
a current limiting arrangement which acts on
a PWM controller that, in operation, delivers PWM pulses (60) having a controllable pulse duty ratio (pwm) and a substantially constant frequency, which current limiting arrangement, in the event a predetermined upper limit value ($I_{roll}$) of the motor current is exceeded, effects a change in the pulse duty factor (pwm), of the pulses (60) delivered by that PWM controller, in order to reduce the motor current,
a voltage divider (234, 238, 240) which supplies a potential which specifies the predetermined upper limit value, and
means for generating a plurality of current pulses in proportion to rotation speed and for applying said current pulses to said voltage divider, to thereby increase the upper limit value of the motor current as a function of rotation speed.

16. The motor according to claim 15, wherein the motor is a brushless electronically commutated external-rotor motor.

17. An electronically commutated DC motor that is equipped with
a current limiting arrangement which acts on
a PWM controller that, in operation, delivers PWM pulses (60) having a controllable pulse duty ratio (pwm) and a substantially constant frequency, which current limiting arrangement, in the event a predetermined upper limit value of the motor current ($I_{ist}$) is exceeded, effects a change in the pulse duty factor, of the pulses (60) delivered by that PWM controller, in order to reduce the motor current ($I_{ist}$),
a voltage divider (234, 238, 240), including a splitting resistor, supplying an output voltage which specifies the upper limit value, and
a capacitor (236), arranged in parallel with said splitting resistor, said capacitor being in a discharged state prior to starting of the motor but charging after starting of the motor (10), said capacitor in its discharged state serving as a short circuit for said splitting resistor (234) and thereby tending to increase said upper limit value, said capacitor, when charged, serving to decrease said upper limit value.

* * * * *